US008502936B2

(12) United States Patent
Rasmussen et al.

(10) Patent No.: US 8,502,936 B2
(45) Date of Patent: Aug. 6, 2013

(54) SYSTEM, APPARATUS AND METHODS FOR IMPROVED TRANSMISSIVITY OF LCD PANEL

(75) Inventors: James M. Rasmussen, Chicago, IL (US); Chris W. Chudek, Chicago, IL (US); Paul M. Lesley, Blue Island, IL (US)

(73) Assignee: WMS Gaming Inc., Waukegan, IL (US)

( * ) Notice: Subject to any disclaimer, the term of this patent is extended or adjusted under 35 U.S.C. 154(b) by 908 days.

(21) Appl. No.: 12/567,346

(22) Filed: Sep. 25, 2009

(65) Prior Publication Data

US 2010/0081502 A1 Apr. 1, 2010

Related U.S. Application Data

(60) Provisional application No. 61/100,462, filed on Sep. 26, 2008, provisional application No. 61/180,333, filed on May 21, 2009.

(51) Int. Cl.
*G02F 1/1347* (2006.01)

(52) U.S. Cl.
USPC .................................. 349/74; 349/96; 463/20

(58) Field of Classification Search
None
See application file for complete search history.

(56) References Cited

U.S. PATENT DOCUMENTS

| | | | |
|---|---|---|---|
| 6,280,328 B1 | 8/2001 | Holch et al. | |
| 6,517,433 B2 | 2/2003 | Loose et al. | |
| 7,410,419 B2 | 8/2008 | Fiden | |
| 7,458,890 B2 | 12/2008 | Loose et al. | |
| 7,594,852 B2 | 9/2009 | Rasmussen | |
| 2003/0045354 A1 | 3/2003 | Giobbi | |
| 2003/0087690 A1 | 5/2003 | Loose et al. | |
| 2004/0198485 A1 | 10/2004 | Loose et al. | |
| 2004/0219968 A1 | 11/2004 | Fiden et al. | |
| 2006/0274221 A1* | 12/2006 | Aoshima et al. | 349/56 |
| 2008/0004104 A1 | 1/2008 | Durham et al. | |
| 2008/0096655 A1 | 4/2008 | Rasmussen et al. | |
| 2008/0113755 A1 | 5/2008 | Rasmussen et al. | |
| 2008/0119288 A1 | 5/2008 | Rasmussen | |
| 2008/0129916 A1* | 6/2008 | Ota et al. | 349/58 |
| 2008/0207303 A1 | 8/2008 | Rasmussen | |
| 2009/0075721 A1 | 3/2009 | Pacey et al. | |

FOREIGN PATENT DOCUMENTS

| | | |
|---|---|---|
| WO | WO 2006/124976 | 11/2006 |
| WO | WO 2007/089410 | 8/2007 |
| WO | WO 2008/011049 | 1/2008 |

OTHER PUBLICATIONS

Stone, Maureen, et al. "Alpha, Contrast and the Perception of Visual Metadata." *Simon Fraser University*: 5 pages.
"Learn About LCD TV and TFT LCD Displays." AVDEALS.com. Sep. 14, 2009:7 pages. http://www.avdeals.com/classroom/what_is_tft_lcd.htm.

(Continued)

*Primary Examiner* — Richard Kim
(74) *Attorney, Agent, or Firm* — Nixon Peabody LLP

(57) ABSTRACT

A gaming system includes a first display configured to display the random outcome of the wagering game, and a second display disposed to overlay at least a portion of the first display. The second display includes a transmissive liquid crystal display defining a transmissive window behind which a corresponding portion of the first display is positioned. The liquid crystal display further includes a polarizing film having a plurality of patterned features generally aligned with the transmissive window. The polarizing film is at least partially removed in the area of the patterned features to enhance transmissivity of the liquid crystal display.

24 Claims, 17 Drawing Sheets

OTHER PUBLICATIONS

"Liquid Crystal Display." Wikipedia.org. Sep. 14, 2009: 16 pages. <http://en.wikipedia.org/wiki/Liquid_crystal_display>.

* cited by examiner

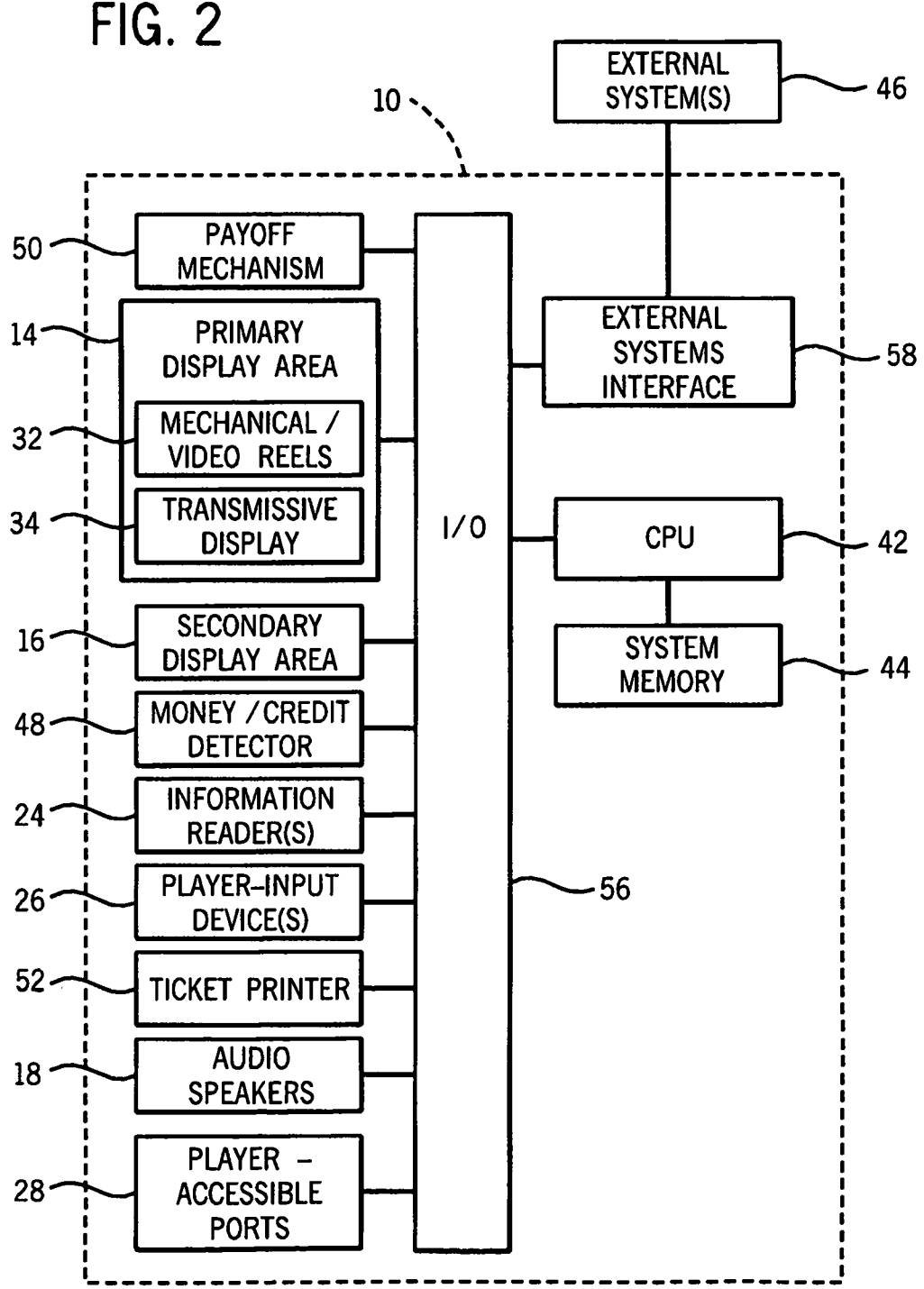

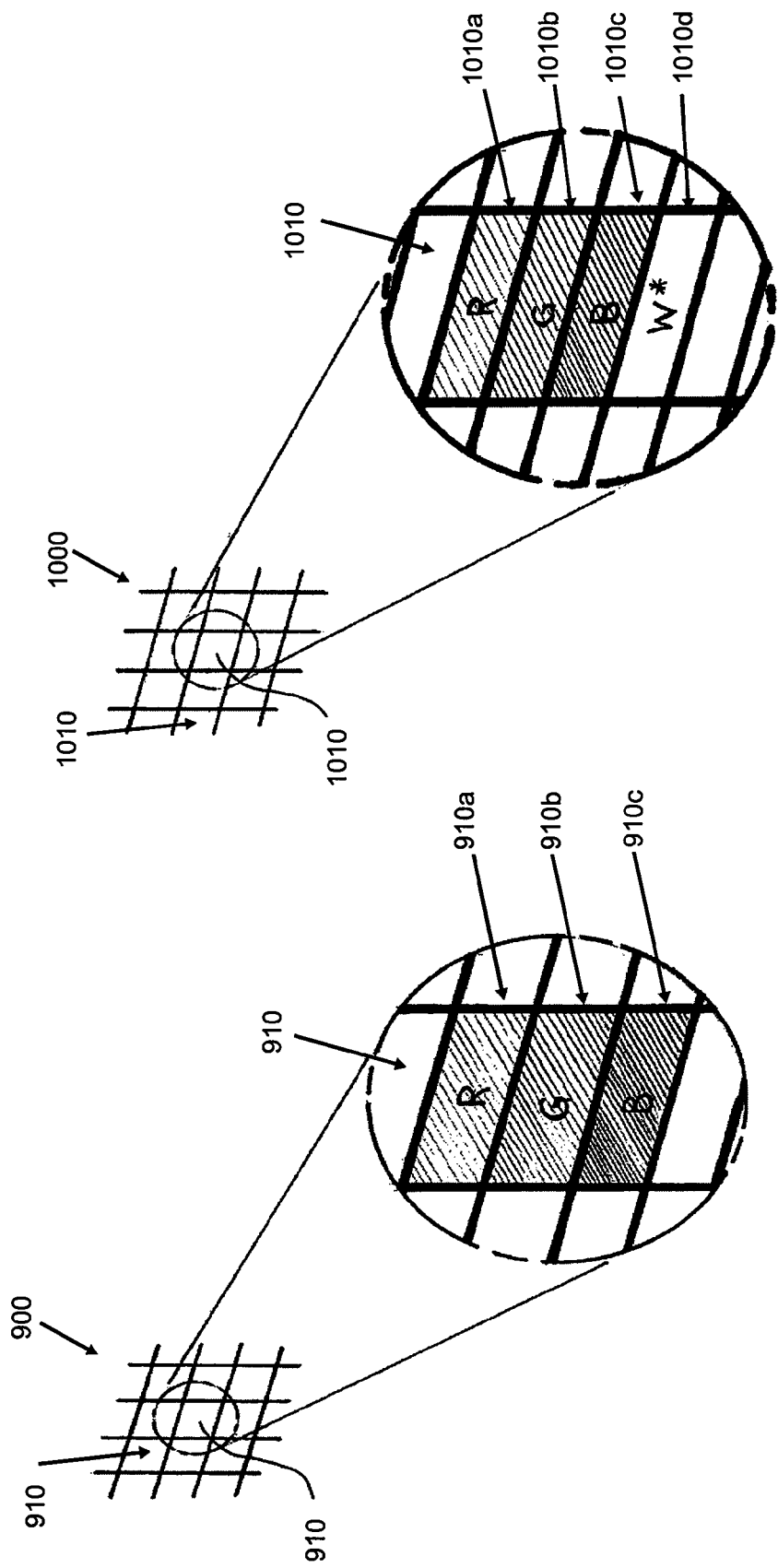

SYSTEM, APPARATUS AND METHODS FOR IMPROVED TRANSMISSIVITY OF LCD PANEL

CLAIM OF PRIORITY AND CROSS-REFERENCE TO RELATED APPLICATIONS

This non-provisional application claims the benefit of and priority to U.S. Provisional Patent Application No. 61/100,462, filed on Sep. 26, 2008, and U.S. Provisional Patent Application No. 61/180,333, filed on May 21, 2009, both of which are incorporated herein by reference in their entireties.

COPYRIGHT

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever.

FIELD OF THE INVENTION

The present invention relates generally to liquid crystal displays (LCD), and more particularly to LCDs used in a wagering game apparatus and wagering game systems, and in methods for conducting wagering games.

BACKGROUND OF THE INVENTION

Gaming terminals, such as slot machines, video poker machines and the like, have been a cornerstone of the gaming industry for several years. Liquid crystal displays, or LCDs, have long been incorporated into gaming machines to enhance the flexibility of the displayed wagering games. However, some players prefer to see mechanical reels rather than a video rendering of a slot machine game, in part due to the more traditional appearance of the rotating slot reels. Utilization of mechanical reels makes the wagering game more enjoyable for such players, but limits the ability of the wagering game machine to present computer graphics and animation to enhance the theme of the wagering game or to provide other information, and so may be less entertaining to players than a wagering game utilizing a touchscreen LCD wagering game system.

SUMMARY OF THE INVENTION

According to one aspect of the present invention, a gaming system includes a first display configured to display the random outcome of the wagering game and a second display disposed to overlay at least a portion of the first display. The second display includes a transmissive liquid crystal display defining a transmissive window behind which a corresponding portion of the first display is positioned. The liquid crystal display further includes a polarizing film having a plurality of patterned features generally aligned with the transmissive window. The polarizing film is at least partially removed in the area of the patterned features to enhance transmissivity of the liquid crystal display.

According to another aspect of the invention, a method of conducting a wagering game on a gaming system includes acts of receiving a wager, generating a random outcome for the wagering game, displaying the random outcome on a first display, displaying a video image on a transmissive window of a transmissive liquid crystal display, the liquid crystal display overlaying the first display, and transmitting light through patterned features in a polarization film of the transmissive window irrespective of a state of a liquid crystal in the liquid crystal display.

According to yet another aspect of the invention, one or more computer readable storage media is encoded with instructions for directing a gaming system to perform the above methods.

In another aspect of the invention, a liquid crystal display comprises a first substrate bearing a first polarizing film, a second substrate bearing a second polarizing film, a liquid crystal disposed between the first substrate and the second substrate, and a backlight disposed behind the first polarizing film, the backlight having an opening therein defining a transmissive window, wherein at least one of the first polarizing film and the second polarizing film comprises a plurality of patterned features formed in an area corresponding to the transmissive window and wherein the polarizing film is at least substantially removed in the area of the patterned feature to enhance transmissivity of the liquid crystal display in the transmissive window.

In still another aspect, a gaming system comprises a first display configured to display the random outcome of the wagering game, and a second display disposed to overlay at least a portion of the first display, the second display comprising a transmissive liquid crystal display defining at least one transmissive window behind which a corresponding portion of the first display is positioned, wherein the second display includes a first surface area having a first degree of transmissivity and a second surface area having a second degree of transmissivity different from the first degree of transmissivity, the first area being different from the second area.

In another embodiment, a liquid crystal display comprises a first substrate bearing a first polarizing film, a second substrate bearing a second polarizing film, a liquid crystal disposed between the first substrate and the second substrate and a backlight disposed behind the first polarizing film, the backlight having an opening therein defining a transmissive window, wherein at least one of the first polarizing film and the second polarizing film comprises an area in which the polarizing film is removed in an area corresponding to the transmissive window.

The above features and advantages, and other features and advantages of the present invention, will be readily apparent from the following detailed description of the preferred embodiments and best modes for carrying out the present invention when taken in connection with the accompanying drawings and appended claims.

BRIEF DESCRIPTION OF THE DRAWINGS

FIG. 2 is a schematic illustration of a gaming system according to an embodiment of the present invention.

FIG. 9 shows a representation of a convention R-G-B pixel arrangement.

FIG. 10 shows a representation of a R-G-B-W pixel arrangement in accord with at least some concepts of the present aspects.

Figure 1A:
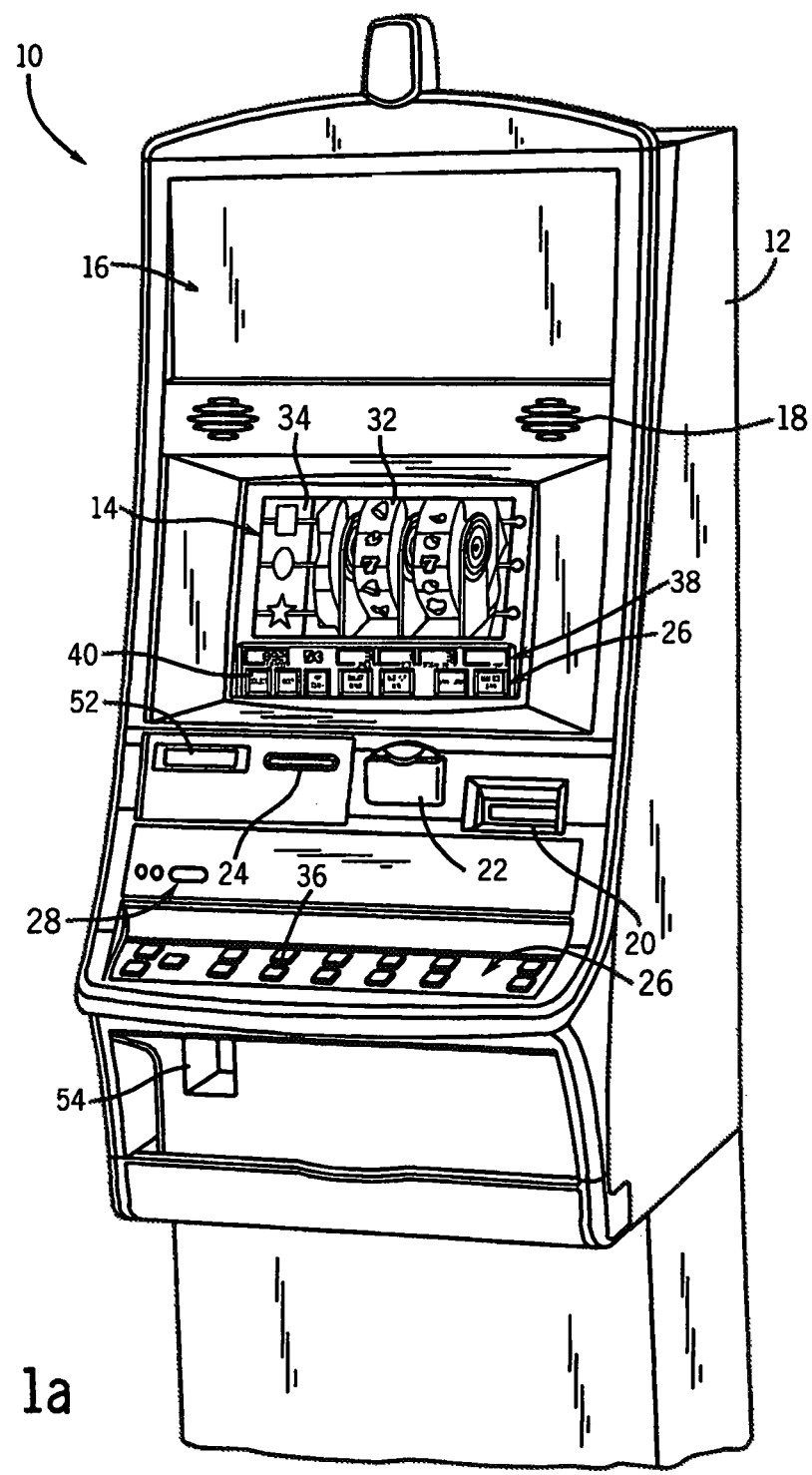
FIG. 1a is a perspective-view illustration of a free-standing gaming terminal according to an embodiment of the present invention.

While the invention is susceptible to various modifications and alternative forms, specific embodiments have been shown by way of example in the drawings and will be described in detail herein. It should be understood, however, that the invention is not intended to be limited to the particular forms disclosed. Rather, the invention is to cover all modifications, equivalents, and alternatives falling within the spirit and scope of the invention as defined by the appended claims.

DETAILED DESCRIPTION OF THE ILLUSTRATED EMBODIMENTS

While this invention is susceptible of embodiment in many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated.

Referring to FIG. 1a, there is shown a gaming terminal 10 similar to those used in gaming establishments, such as casinos. With regard to the present invention, the gaming terminal 10 may be any type of gaming terminal and may have varying structures and methods of operation. For example, the gaming terminal 10 may be an electromechanical gaming terminal configured to play mechanical slots, or it may be an electronic gaming terminal configured to play a video casino game, such as slots, keno, poker, blackjack, roulette, craps, etc. It should be understood that although the gaming terminal 10 is shown as a free-standing terminal of the upright type, it may take on a wide variety of other forms such as a free-standing terminal of the slant-top type, a portable or handheld device primarily used for gaming, presented in a representative embodiment in FIG. 1b, a mobile telecommunications device, such as a mobile telephone or personal digital assistant (PDA), a counter-top or bar-top gaming terminal, or other personal electronic device, such as a portable television, MP3 player, entertainment device, etc.

The illustrated gaming terminal 10 comprises a cabinet or housing 12. For output devices, the gaming terminal 10 may include a primary display area 14, a secondary display area 16, and one or more audio speakers 18. The primary display area 14 and/or secondary display area 16 may display information associated with wagering games, non-wagering games, community games, progressives, advertisements, services, premium entertainment, text messaging, emails, alerts or announcements, broadcast information, subscription information, etc. For input devices, the gaming terminal 10 may include a bill validator 20, a coin acceptor 22, one or more information readers 24, one or more player-input devices 26, and one or more player-accessible ports 28 (e.g., an audio output jack for headphones, a video headset jack, a wireless transmitter/receiver, etc.). While these typical components found in the gaming terminal 10 are described below, it should be understood that numerous other peripheral devices and other elements may exist and may be used in any number of combinations to create various forms of a gaming terminal.

The primary display area 14 may include a mechanical-reel display, a video display, or a combination thereof. For example, in regard to the latter, a transmissive video display oriented in front of a mechanical-reel display portrays a video image superimposed over the mechanical-reel display. The primary display area 14 may also comprise a plurality of display types. For example, a portion of the primary display area 14 could comprise a transmissive video display, whereas another portion of the primary display area may comprise a mechanical-reel display. Further information concerning transmissive video displays is disclosed in commonly owned U.S. Pat. No. 6,517,433, to Loose et al., entitled "Reel Spinning Slot Machine with Superimposed Video Image," U.S. Pat. No. 7,410,419, to Fiden, entitled "Gaming Machine having a Crap Slot Game Play Scheme," U.S. Pat. No. 7,458,890, to Loose et al., entitled "Reel Spinning Slot Machine with Superimposed Video Image," U.S. Patent Application Publication No. 2008/0113755, to Rasmussen et al., entitled "Wagering Game with Simulated Mechanical Reels having an Overlying Image Display," U.S. Patent Application Publication No. 2008/0096655, to Rasmussen et al., entitled "Transmissive LCD Display System for Gaming Machine," U.S. Patent Application Publication No. 2008/0004104, to Durham et al., entitled "Wagering Game with Simulated Mechanical Reels," International Publication No. WO 2008/011049 A2, to Rasmussen, entitled "Wagering Game Machine with OLED Transmissive LCD," and International Publication No. WO 2006/124976 A1, to Rasmussen et al., entitled "Wagering Game Machine with Transmissive LCD Lighting," which are each incorporated herein by reference in their entirety.

The video display may include a cathode ray tube (CRT), a high-resolution liquid crystal display (LCD), a plasma display, a light emitting diode (LED), a DLP projection display, an electroluminescent (EL) panel, or any other type of display suitable for use in the gaming terminal 10. The primary display area 14 may include one or more paylines 30 (see FIG. 3) extending along a portion thereof. In the illustrated embodiment, the primary display area 14 comprises a plurality of mechanical reels 32 and a video display 34 such as a transmissive display (or a reflected image arrangement in other embodiments) in front of the mechanical reels 32. If the wagering game conducted via the gaming terminal 10 relies upon the video display 34 only and not the mechanical reels 32, the mechanical reels 32 may be removed from the interior of the terminal and the video display 34 may be of a non-transmissive type. Further, the underlying mechanical-reel display may be replaced with a video display such that the primary display area 14 includes layered video displays, or may be replaced with another mechanical or physical member such as a mechanical wheel (e.g., a roulette game), dice, a pachinko board, or a diorama presenting a three-dimensional model of a game environment.

Video images in the primary display area 14 and/or the secondary display area 16 may be rendered in two-dimensional (e.g., using Flash Macromedia™) or three-dimensional graphics (e.g., using Renderware™). The images may be played back (e.g., from a recording stored on the gaming terminal 10), streamed (e.g., from a gaming network), or received as a TV signal (e.g., either broadcast or via cable). The images may be animated or they may be real-life images, either prerecorded (e.g., in the case of marketing/promotional material) or as live footage, and the format of the video images may be an analog format, a standard digital format, a high-definition (HD) digital format, and other conceivable formats.

The player-input devices 26 may include a plurality of buttons 36 on a button panel and/or a touch screen 38 mounted over the primary display area 14 and/or the secondary display area 16 and having one or more soft touch keys 40. The player-input devices 26 may further comprise technologies that do not rely upon touching the gaming terminal, such as speech-recognition technology, gesture-sensing technology, eye-tracking technology, etc.

The information reader 24 is preferably located on the front of the housing 12 and may take on many forms such as a ticket reader, card reader, bar code scanner, wireless transceiver (e.g., RFID, Bluetooth, etc.), biometric reader, or computer-readable-storage-medium interface. Information may be transmitted between a portable medium (e.g., ticket, voucher, coupon, casino card, smart card, debit card, credit card, etc.) and the information reader 24 for accessing an account associated with cashless gaming, player tracking, game customization, saved-game state, data transfer, and casino services, as more fully disclosed in U.S. Patent Publication No. 2003/0045354, to Giobbi, entitled "Portable Data Unit for Communicating with Gaming Machine Over Wireless Link," which is incorporated herein by reference in its entirety. The account may be stored at an external system 46 (see FIG. 2), as more fully disclosed in U.S. Pat. No. 6,280,328, to Holch et al., entitled "Cashless Computerized Video Game System and Method," which is incorporated herein by referenced in its entirety, or directly on the portable medium. To enhance security, the individual carrying the portable medium may be required to enter a secondary independent authenticator (e.g., password, PIN number, biometric, etc.) to access their account.

Figure 1B:
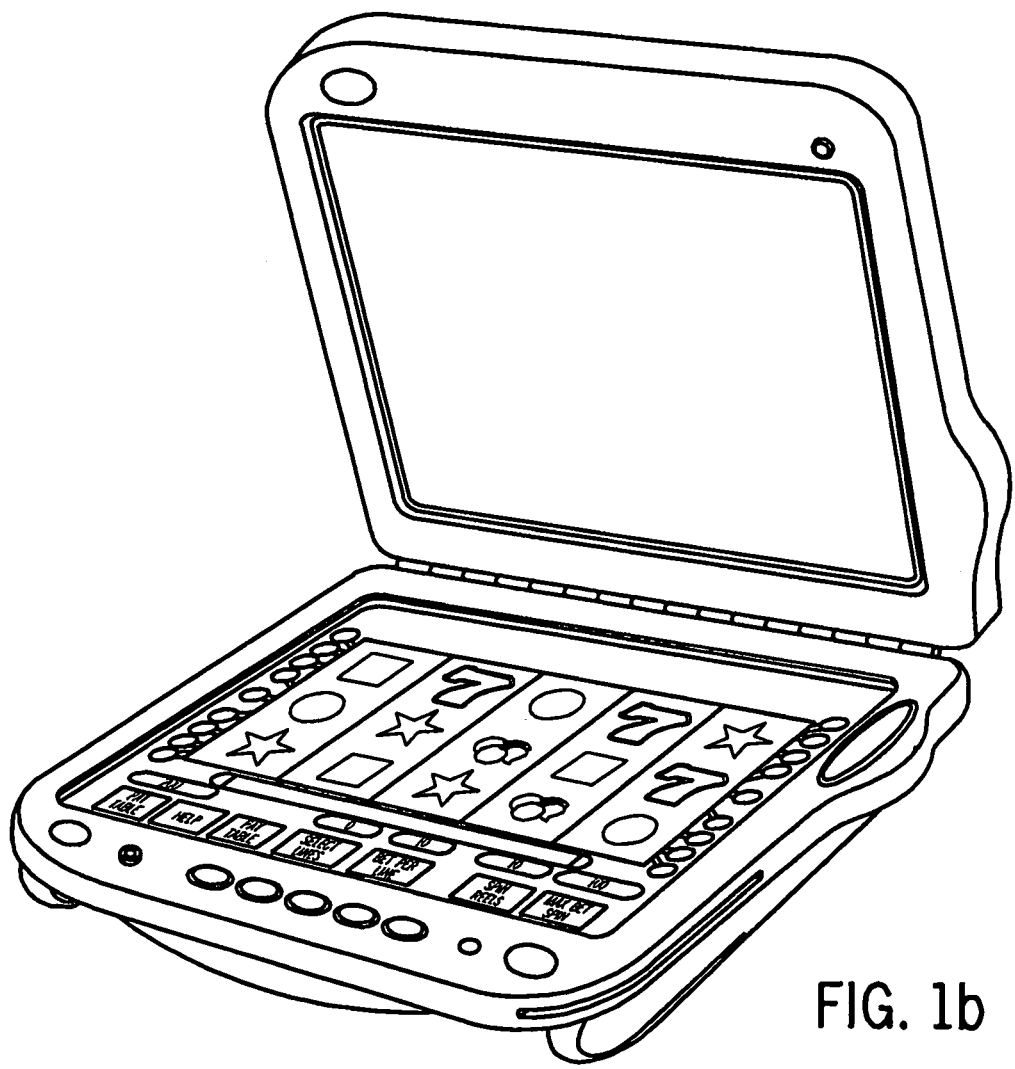
FIG. 1b is a perspective-view illustration of a handheld gaming terminal according to an embodiment of the present invention.

FIG. 1b illustrates a portable or handheld device primarily used to display and/or conduct wagering games. The handheld device may incorporate the same features as the gaming terminal 10, such as a transmissive display, or variations thereof. A more detailed description of a handheld device that may be utilized with the present invention can be found in PCT Patent Application No. PCT/US2007/000792 filed Jan. 26, 2007, entitled "Handheld Device for Wagering Games," which is incorporated herein by reference in its entirety.

Turning now to FIG. 2, the various components of the gaming terminal 10 are controlled by a central processing unit (CPU) 42, also referred to herein as a controller or processor (such as a microcontroller or microprocessor). The CPU 42 can include any suitable processor, such as an Intel® Pentium processor, Intel® Core 2 Duo processor, AMD Opteron™ processor, or UltraSPARC® processor. To provide gaming functions, the controller 42 executes one or more game programs stored in one or more computer readable storage media in the form of memory 44 or other suitable storage device. The controller 42 uses a random number generator (RNG) to randomly generate a wagering game outcome from a plurality of possible outcomes. Alternatively, the outcome may be centrally determined using either an RNG or pooling scheme at a remote controller included, for example, within the external system 46. It should be appreciated that the controller 42 may include one or more microprocessors, including but not limited to a master processor, a slave processor, and a secondary or parallel processor.

The controller 42 is coupled to the system memory 44 and also to a money/credit detector 48. The system memory 44 may comprise a volatile memory (e.g., a random-access memory (RAM)) and a non-volatile memory (e.g., an EEPROM). The system memory 44 may include multiple RAM and multiple program memories. The money/credit detector 48 signals the processor that money and/or credits have been input via a value-input device, such as the bill validator 20, coin acceptor 22, or via other sources, such as a cashless gaming account, etc. These components may be located internal or external to the housing 12 of the gaming terminal 10 and connected to the remainder of the components of the gaming terminal 10 via a variety of different wired or wireless connection methods. The money/credit detector 48 detects the input of funds into the gaming terminal 10 (e.g., via currency, electronic funds, ticket, card, etc.) that are generally converted into a credit balance available to the player for wagering on the gaming terminal 10. The credit detector 48 detects when a player places a wager (e.g., via a player-input device 26) to play the wagering game, the wager then generally being deducted from the credit balance. The money/credit detector 48 sends a communication to the controller 42 that a wager has been detected and also communicates the amount of the wager.

As seen in FIG. 2, the controller 42 is also connected to, and controls, the primary display area 14, the player-input device 26, and a payoff mechanism 50. The payoff mechanism 50 is operable in response to instructions from the controller 42 to award a payoff to the player in response to certain winning outcomes that might occur in the base game, the bonus game(s), or via an external game or event. The payoff may be provided in the form of money, redeemable points, services or any combination thereof. Such payoff may be associated with a ticket (from a ticket printer 52), portable data unit (e.g., a card), coins, currency bills, accounts, and the like. The payoff amounts distributed by the payoff mechanism 50 are determined by one or more pay tables stored in the system memory 44.

Communications between the controller 42 and both the peripheral components of the gaming terminal 10 and the external system 46 occur through input/output (I/O) circuit 56, which can include any suitable bus technologies, such as an AGTL+ frontside bus and a PCI backside bus. Although the I/O circuit 56 is shown as a single block, it should be appreciated that the I/O circuit 56 may include a number of different types of I/O circuits. Furthermore, in some embodiments, the components of the gaming terminal 10 can be interconnected according to any suitable interconnection architecture (e.g., directly connected, hypercube, etc.).

The I/O circuit 56 is connected to an external system interface 58, which is connected to the external system 46. The controller 42 communicates with the external system 46 via the external system interface 58 and a communication path (e.g., serial, parallel, IR, RC, 10bT, etc.). The external system 46 may include a gaming network, other gaming terminals, a gaming server, a remote controller, communications hardware, or a variety of other interfaced systems or components.

Controller 42, as used herein, comprises any combination of hardware, software, and/or firmware that may be disposed or resident inside and/or outside of the gaming terminal 10 and may communicate with and/or control the transfer of data between the gaming terminal 10 and a bus, another computer, processor, or device and/or a service and/or a network. The controller 42 may comprise one or more controllers or processors. In FIG. 2, the controller 42 in the gaming terminal 10 is depicted as comprising a CPU, but the controller 42 may alternatively comprise a CPU in combination with other components, such as the I/O circuit 56 and the system memory 44. The controller 42 is operable to execute all of the various gaming methods and other processes disclosed herein.

The gaming terminal 10 may communicate with external system 46 (in a wired or wireless manner) such that each terminal operates as a "thin client" having relatively less functionality, a "thick client" having relatively more functionality, or with any range of functionality therebetween (e.g., a "rich client"). In general, a wagering game includes an RNG for generating a random number, game logic for determining the outcome based on the randomly generated number, and game assets (e.g., art, sound, etc.) for presenting the determined outcome to a player in an audio-visual manner. The RNG, game logic, and game assets may be contained within the gaming terminal 10 ("thick client" gaming terminal), the external systems 46 ("thin client" gaming terminal), or distributed therebetween in any suitable manner ("rich client" gaming terminal).

Figure 3:
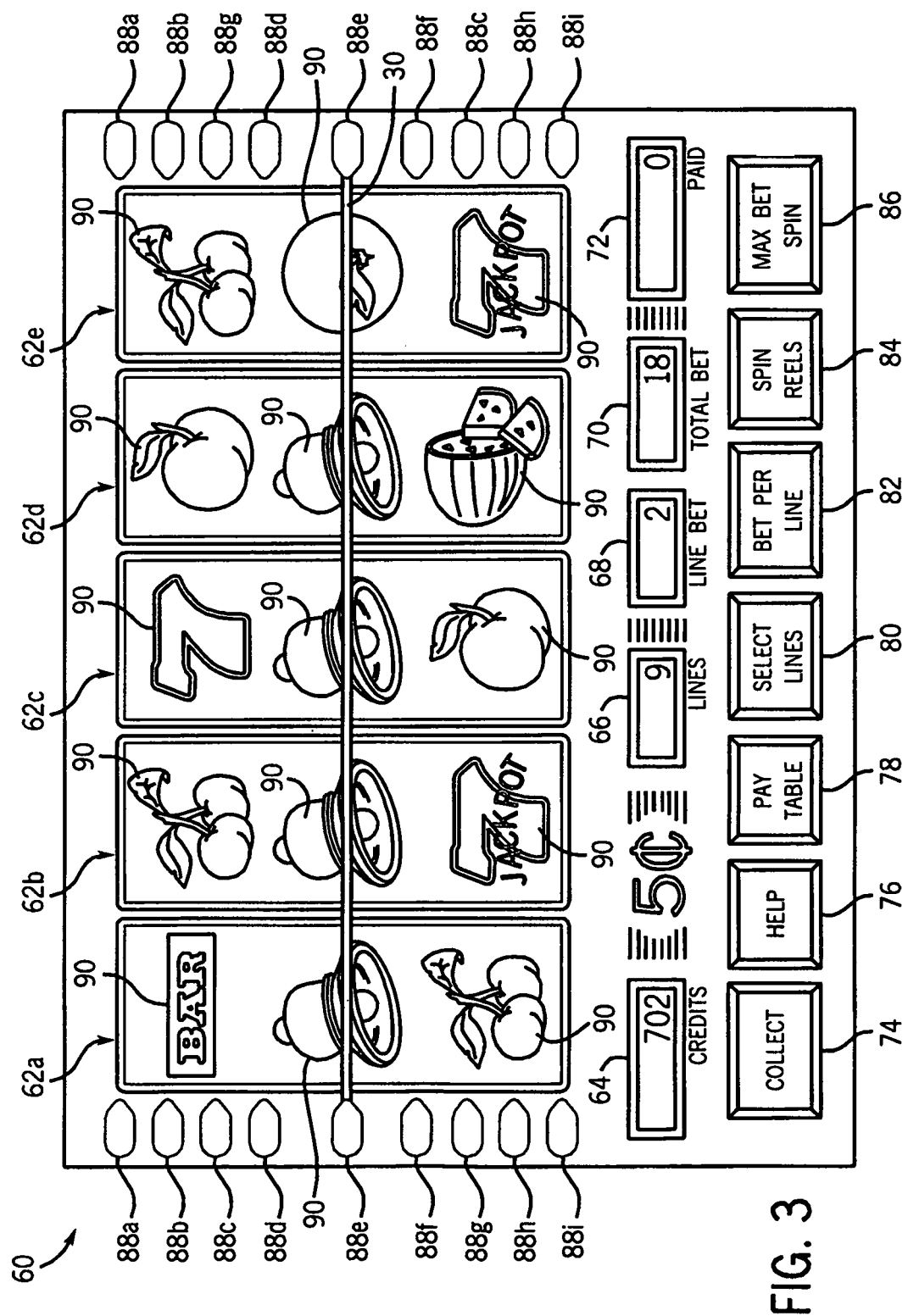
FIG. 3 is an image of a basic-game screen of a wagering game that may be displayed on a gaming terminal, according to an embodiment of the present invention.

Referring now to FIG. 3, an image of a basic-game screen 60 adapted to be displayed on the primary display area 14 is illustrated, according to one embodiment of the present invention. A player begins play of a basic wagering game by providing a wager. A player can operate or interact with the wagering game using the one or more player-input devices 26. The controller 42, the external system 46, or both, in alternative embodiments, operate(s) to execute a wagering game program causing the primary display area 14 to display the wagering game that includes a plurality of visual elements.

The basic-game screen 60 may be displayed on the primary display area 14 or a portion thereof. In FIG. 3, the basic-game screen 60 portrays a plurality of simulated movable reels 62a-e. Alternatively or additionally, the basic-game screen 60 may portray a plurality of mechanical reels. The basic-game screen 60 may also display a plurality of game-session meters and various buttons adapted to be actuated by a player.

In the illustrated embodiment, the game-session meters include a "credit" meter 64 for displaying a number of credits available for play on the terminal; a "lines" meter 66 for displaying a number of paylines to be played by a player on the terminal; a "line bet" meter 68 for displaying a number of credits wagered (e.g., from 1 to 5 or more credits) for each of the number of paylines played; a "total bet" meter 70 for displaying a total number of credits wagered for the particular round of wagering; and a "paid" meter 72 for displaying an amount to be awarded based on the results of the particular round's wager. The user-selectable buttons may include a "collect" button 74 to collect the credits remaining in the credits meter 64; a "help" button 76 for viewing instructions on how to play the wagering game; a "pay table" button 78 for viewing a pay table associated with the basic wagering game; a "select lines" button 80 for changing the number of paylines (displayed in the lines meter 66) a player wishes to play; a "bet per line" button 82 for changing the amount of the wager which is displayed in the line-bet meter 68; a "spin reels" button 84 for moving the reels 62a-e; and a "max bet spin" button 86 for wagering a maximum number of credits and moving the reels 62a-e of the basic wagering game. While the gaming terminal 10 allows for these types of player inputs, the present invention does not require them and can be used on gaming terminals having more, less, or different player inputs.

Paylines 30 may extend from one of the payline indicators 88a-i on the left side of the basic-game screen 60 to a corresponding one of the payline indicators 88a-i on the right side of the screen 60. A plurality of symbols 90 is displayed on the plurality of reels 62a-e to indicate possible outcomes of the basic wagering game. A winning combination occurs when the displayed symbols 90 correspond to one of the winning symbol combinations listed in a pay table stored in the memory 44 of the terminal 10 or in the external system 46. The symbols 90 may include any appropriate graphical representation or animation, and may further include a "blank" symbol.

Symbol combinations may be evaluated as line pays or scatter pays. Line pays may be evaluated left to right, right to left, top to bottom, bottom to top, or any combination thereof by evaluating the number, type, or order of symbols 90 appearing along an activated payline 30. Scatter pays are evaluated without regard to position or paylines and only require that such combination appears anywhere on the reels 62a-e. While an embodiment with nine paylines is shown, a wagering game with no paylines, a single payline, or any plurality of paylines will also work with the present invention. Additionally, though an embodiment with five reels is shown, a gaming terminal with any plurality of reels may also be used in accordance with the present invention.

Figure 4:
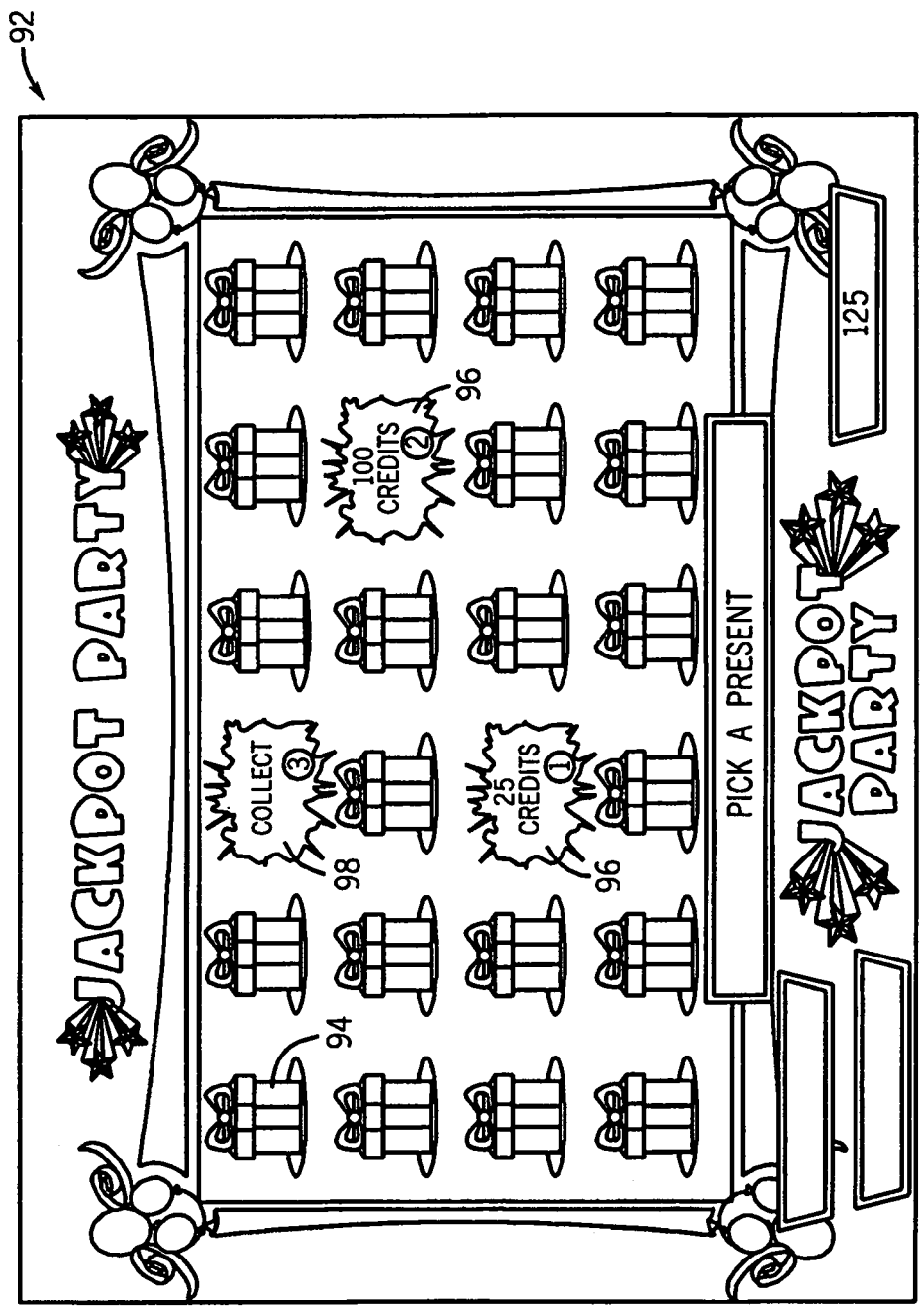
FIG. 4 is an image of a bonus-game screen of a wagering game that may be displayed on a gaming terminal, according to an embodiment of the present invention.

Turning now to FIG. 4, a bonus game that may be included with a basic wagering game is illustrated, according to one embodiment. A bonus-game screen 92 includes an array of markers 94 located in a plurality of columns and rows. The bonus game may be entered upon the occurrence of a special start-bonus game outcome (e.g., symbol trigger, mystery trigger, time-based trigger, etc.) in or during the basic wagering game. Alternatively, the illustrated game may be a stand-alone wagering game.

In the illustrated bonus game, a player selects, one at a time, from the array of markers 94 to reveal an associated bonus-game outcome. According to one embodiment, each marker 94 in the array is associated with an award outcome 96 (e.g., credits or other non-negative outcomes) or an end-game outcome 98 (indicated in FIG. 4 as "COLLECT"). In the illustrated example, a player has selected an award outcome 96 with the player's first two selections (25 credits and 100 credits, respectively). When an end-game outcome 98 is selected (as illustrated by the player's third pick), the bonus game is terminated and the accumulated award outcomes 96 are provided to the player.

Figure 5A:
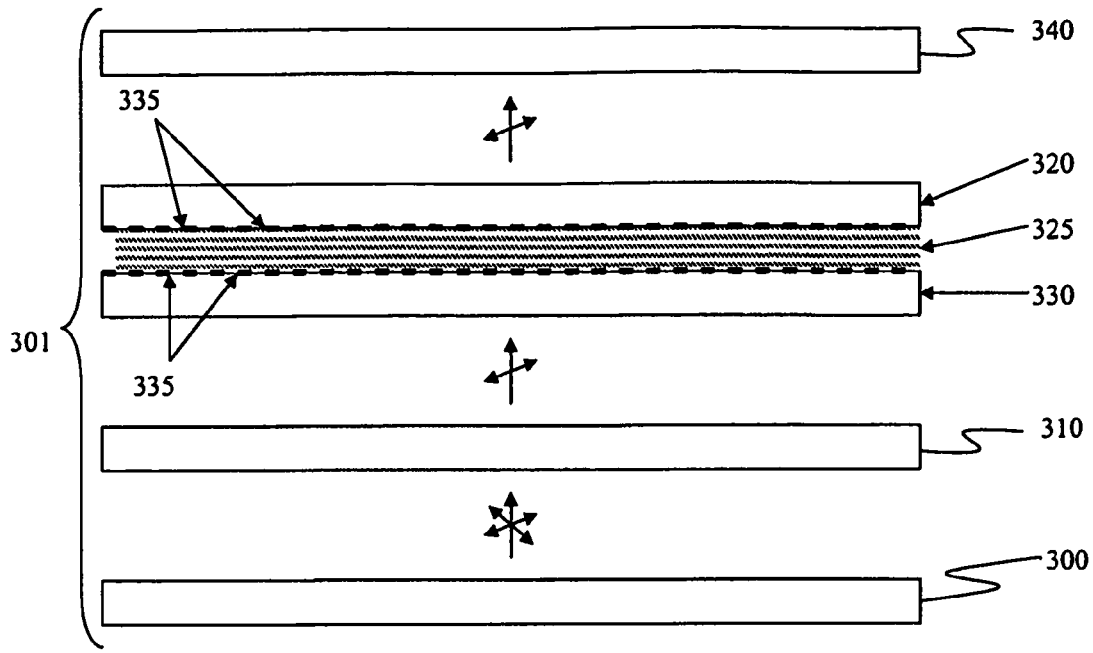
FIGS. 5A and 5B are representations of an LCD display.
Figure 5B:
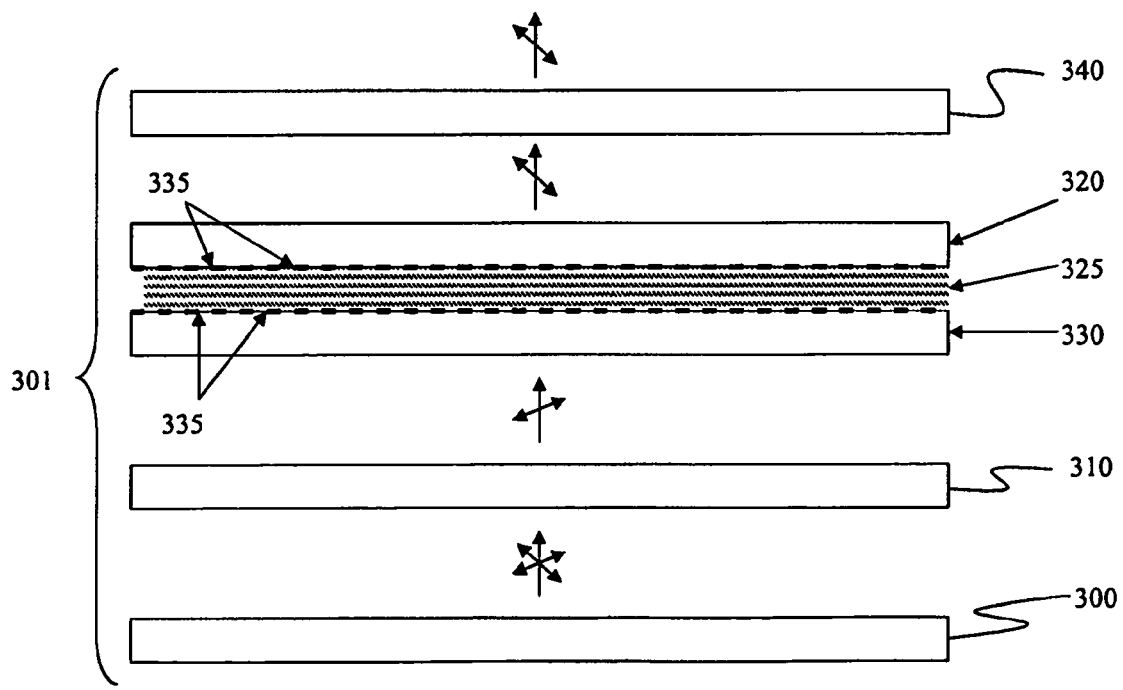

FIGS. 5A-5B show a simplified representation of an LCD display 301 that may be used, such as in a primary display 14 or secondary display 16, in accord with aspects of the present concepts. Light is output from a backlight 300 which may comprise, but is not limited to, an electroluminescent panel (ELP) or LEDs, OLEDs, incandescent light bulb, cold cathode fluorescent lamp(s) (CCFL), or hot cathode fluorescent lamp(s) (HCFL) used in combination with one or more diffuser elements and/or light guides. Any manner of backlight illumination may be employed in combination with the concepts disclosed herein including, for example, a point source light, multi-point source lights, or distributed lighting. The light output from the backlight 300 is incident onto the back polarizing film 310 and the light output from the back polarizing film 310 is oriented to a single state of polarization that is perpendicular to that of the front polarizing film 340. The polarized light then passes through a twisted nematic liquid crystal layer 325. The orientation of the liquid crystals in the liquid crystal layer 325 may be selectively controlled by applying a desired voltage to the transparent electrodes 335 disposed on the adjacent glass substrates 320, 330. In particular, the orientation of the liquid crystals in the liquid crystal layer 325 may be selectively controlled to rotate the incoming polarized light 90°. For example, when no voltage is applied to the electrodes (an "off" state), the twisted nematic liquid crystal layer 325 may be adapted to rotate the incoming polarized light 90°, so that it is of the same polarization as the front polarizing film and may pass therefore through the front polarizing film 340 (e.g., to form an "on" or "bright" pixel). Conversely, in such example, when voltage is applied to the electrodes (an "on" state), the twisted nematic liquid crystal layer 325 does not rotate the incoming polarized light and outputs linearly polarized light that is perpendicular to a direction of polarization for the front polarizing film 340 and is correspondingly blocked by the front polarizing film 340 (e.g., to form an "off" or "dark" pixel). Additional layers may also be applied over the front polarizing film 340, such as an anti-glare or anti-reflection film or a hardcoat protective layer.

Although the above description relates to "on" and "off" voltage states of the electrodes controlling the state of the twisted nematic liquid crystal layer 325, intermediate voltages produce intermediate degrees of twist of the twisted nematic liquid crystal layer 325 and accordingly produce a spectrum of grayscale outputs. Accordingly, the twisted nematic liquid crystal layer 325 can be used to create a color display by using a red, green, and blue subpixel for each pixel location, so that a full color spectrum can be displayed for each pixel by varying the amount of these three light primary colors that is visible by varying the voltages applied to each of the three colored subpixels of a color filter (not shown) using an associated graphic controller. The varying voltage correspondingly varies the amount of colored light from the backlight of the display panel that reaches the viewer.

The back polarizing film 310 and front polarizing film 340 are, however, associated with a significant absorption loss—up to about 93% in some applications where the system is configured to pass light. Thus, of the light generated by the backlight 300, a significant amount of light is absorbed by each of the back polarizing film 310 and the front polarizing film 340 and only about 10% of the light eventually reaches the player's eye when the twisted nematic liquid crystal layer 325 is oriented to pass the light output by the rear polarizing film 310. The absorption losses decrease both light transmissivity and the contrast ratio (C/R) (i.e., the ratio of the luminance of the brightest color (white) to that of the darkest color (black) that the system is capable of producing). The color filter further attenuate the transmissivity.

Figure 5C:
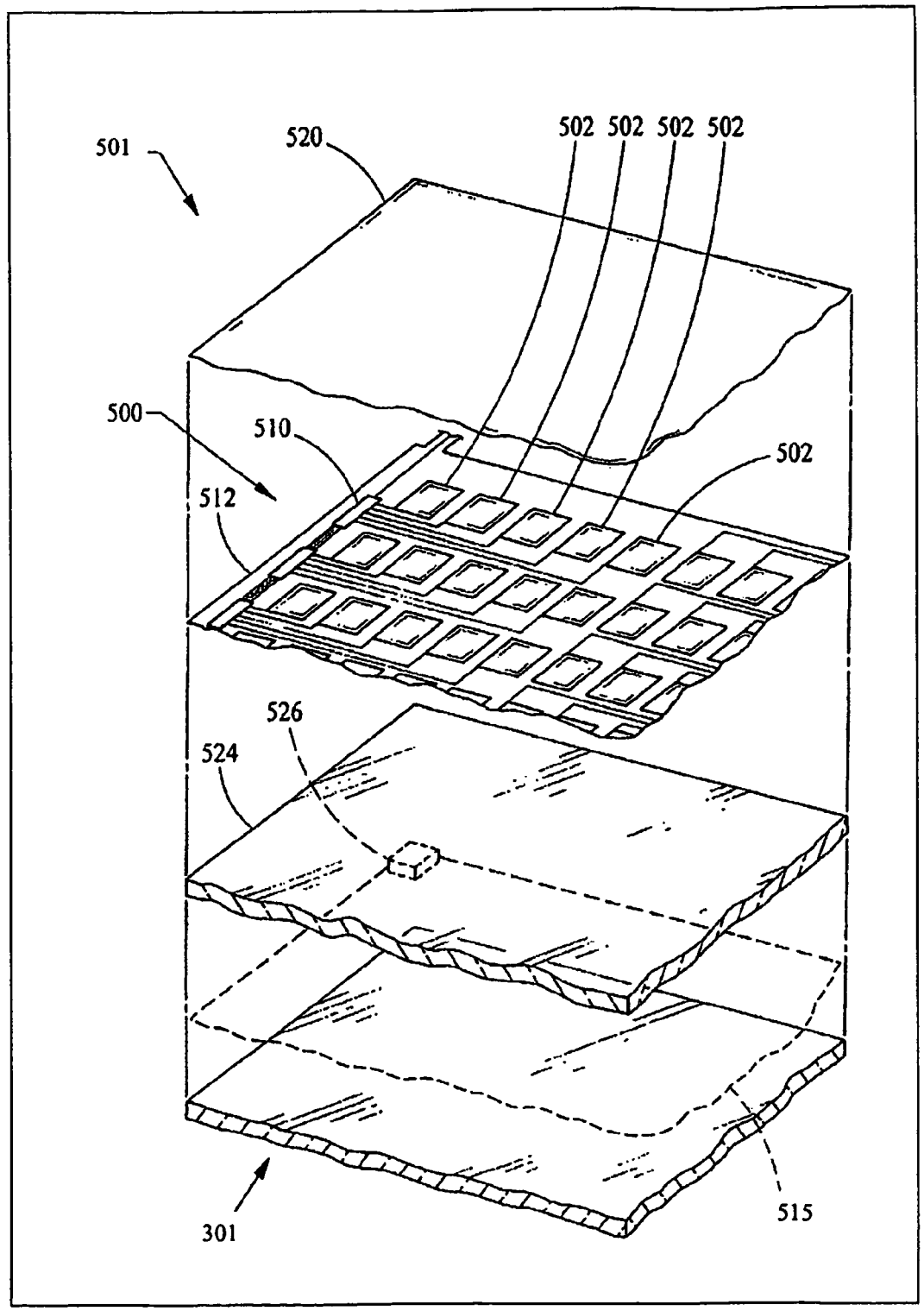
FIG. 5C is a representation of a touchscreen LCD display.

FIG. 5C shows a simplified view of a touchscreen, transmissive LCD display comprising the LCD display 301 of FIGS. 5A and 5B. Transparent capacitive electrodes 502 are arranged in an array across a surface of a transparent substrate 512. Sensor circuits 510 are connected (e.g., serially) to measure the capacitance of each corresponding electrode 502 to which they are connected via traces that are preferably, but not necessarily, translucent. The electrodes 502 advantageously have a size, shape, and spacing dimensioned to detect an input from a finger. In the illustrated embodiment, individual electrodes 502 measure their own capacitance independent of the other electrodes relative to ground. In another embodiment, the capacitance is measured between two or more electrodes, producing a higher "resolution" of touchpoints as the electrodes can be made smaller and can overlap one another.

In the example of FIG. 5C, the touchscreen 500 overlays a transparent glass or plastic substrate 524, which together overlay display elements such as, for example, LCD display 301. An optional haptic touchscreen 515 includes actuating devices 526 (such as one near each corner of the haptic touchscreen 515). The actuating devices 526 are selectively actuable in one or more modes to generate a vibration profile yielding a haptic effect. A protective transparent cover 520 is placed over the transparent substrate 512. Because the electrodes 502 are capacitive-sensing, touches on the protective cover 520 will cause a change in capacitance in the electrodes 502. The outputs of the sensor circuits 510 are coupled to a controller that processes data representing which electrodes 502 measured a change in capacitance. The magnitude of the change represents a pressure. A greater deviation in capacitance represents a greater pressure, and these deviations can be converted by an analog-to-digital converter into numbers representing an amount of pressure. The data can also represent a gesture where multiple electrodes 502 register a touch at various time intervals. The velocity, direction, and acceleration of the gesture can be represented in the data. Other touch sensing technologies could alternatively be utilized, including resistive sensing, surface acoustic wave sensing, pressure sensing, optical sensing, and the like.

Figure 6A:
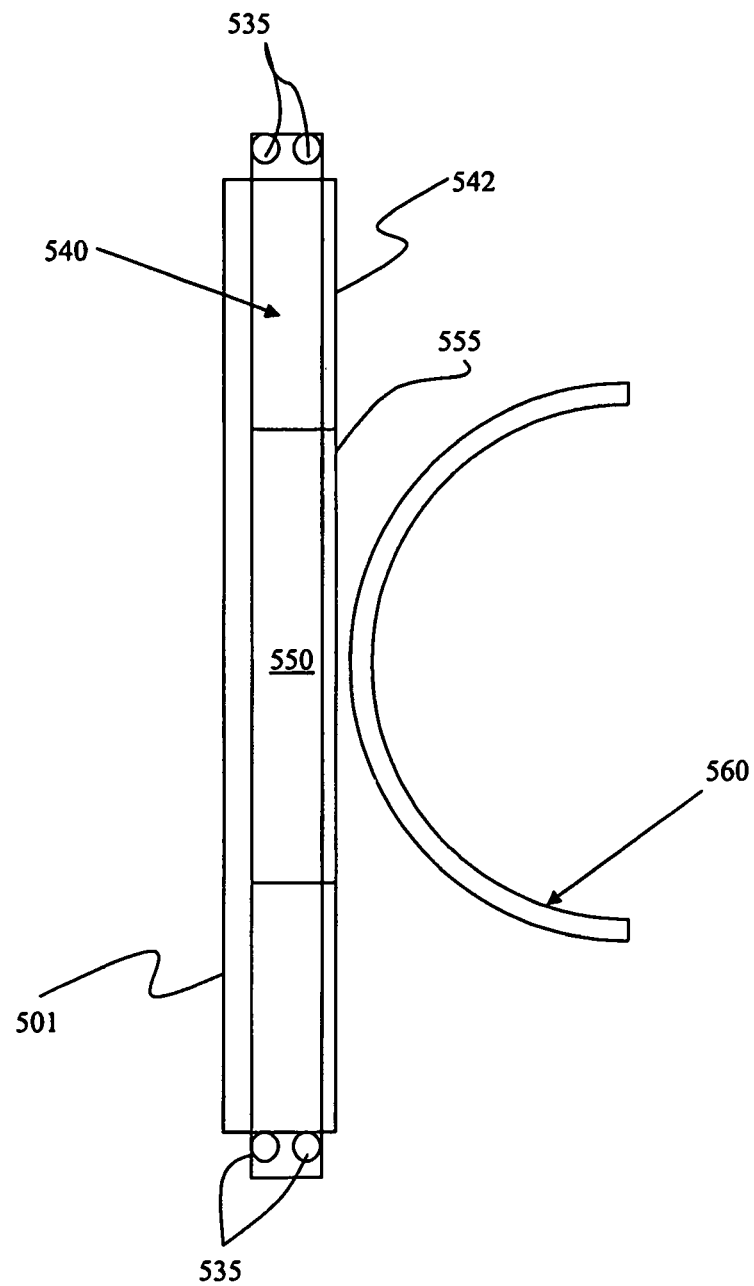
FIGS. 6A-6E are representations of different embodiments of a transmissive display in accord with various embodiments of the present invention.
Figure 6B:
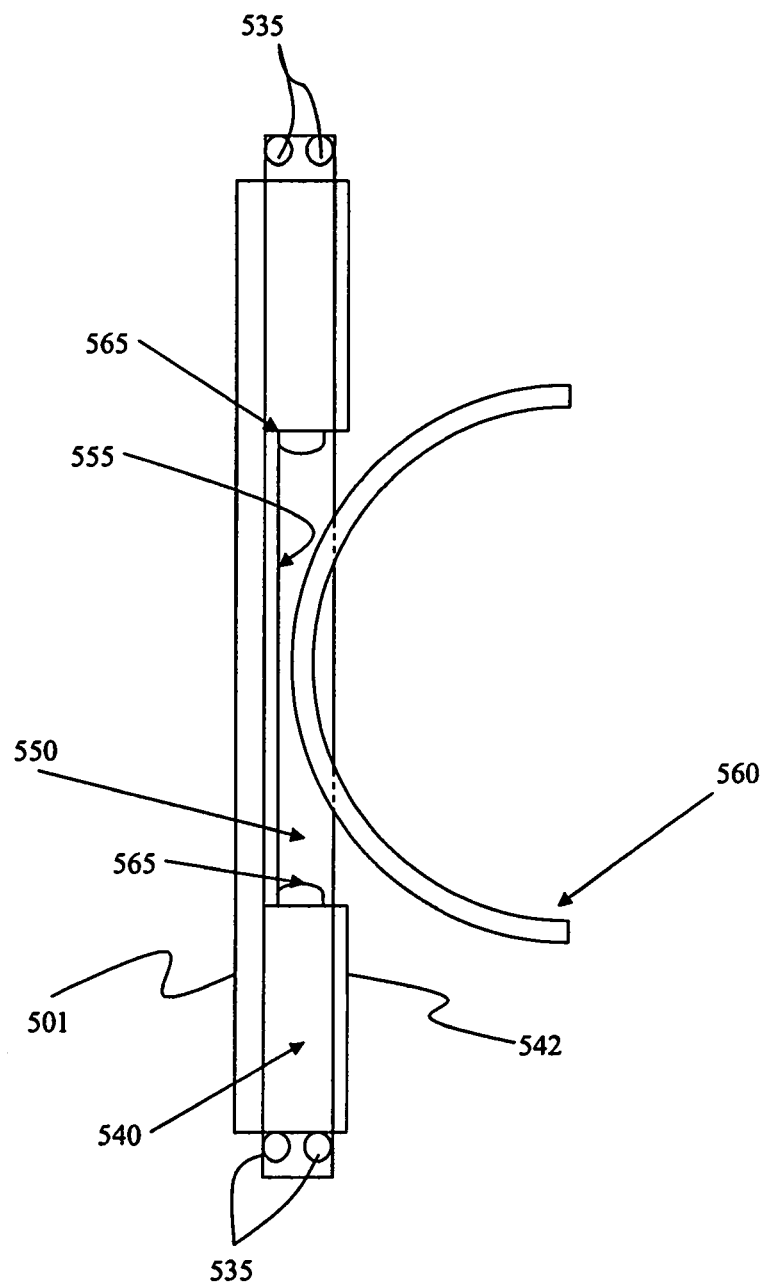
Figure 6C:
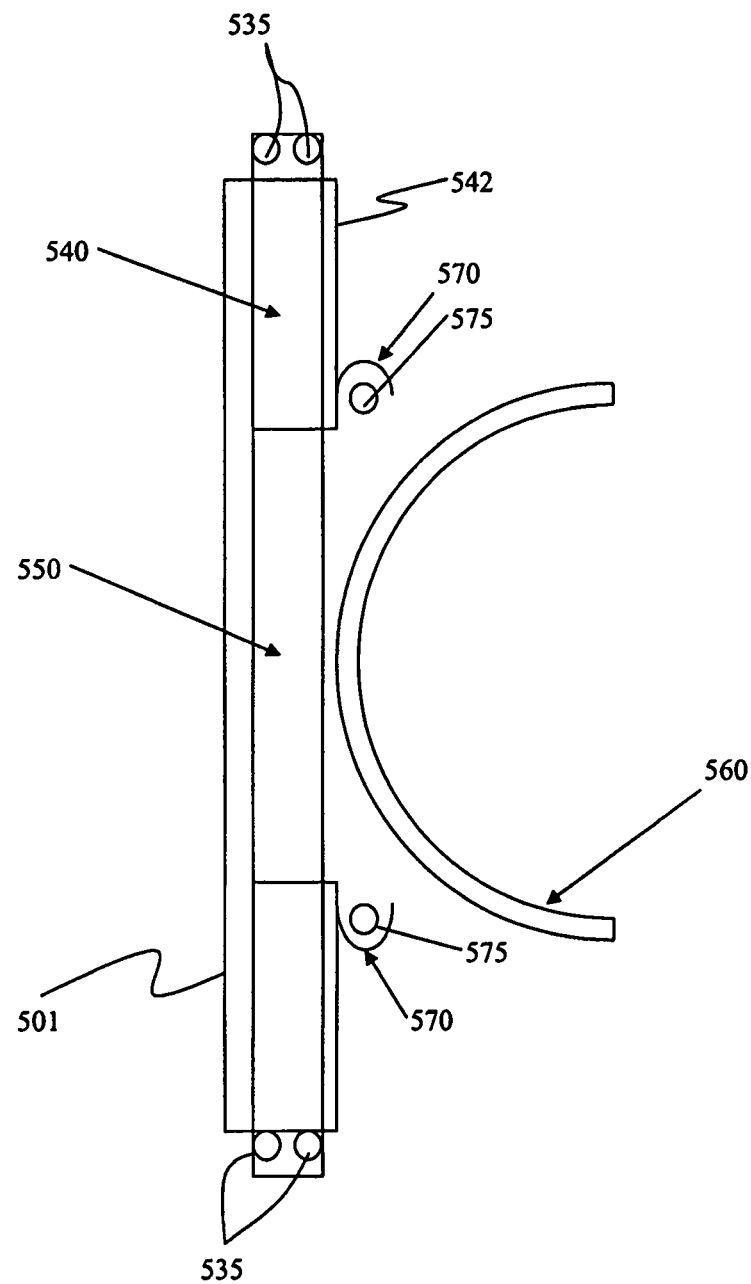
Figure 6D:
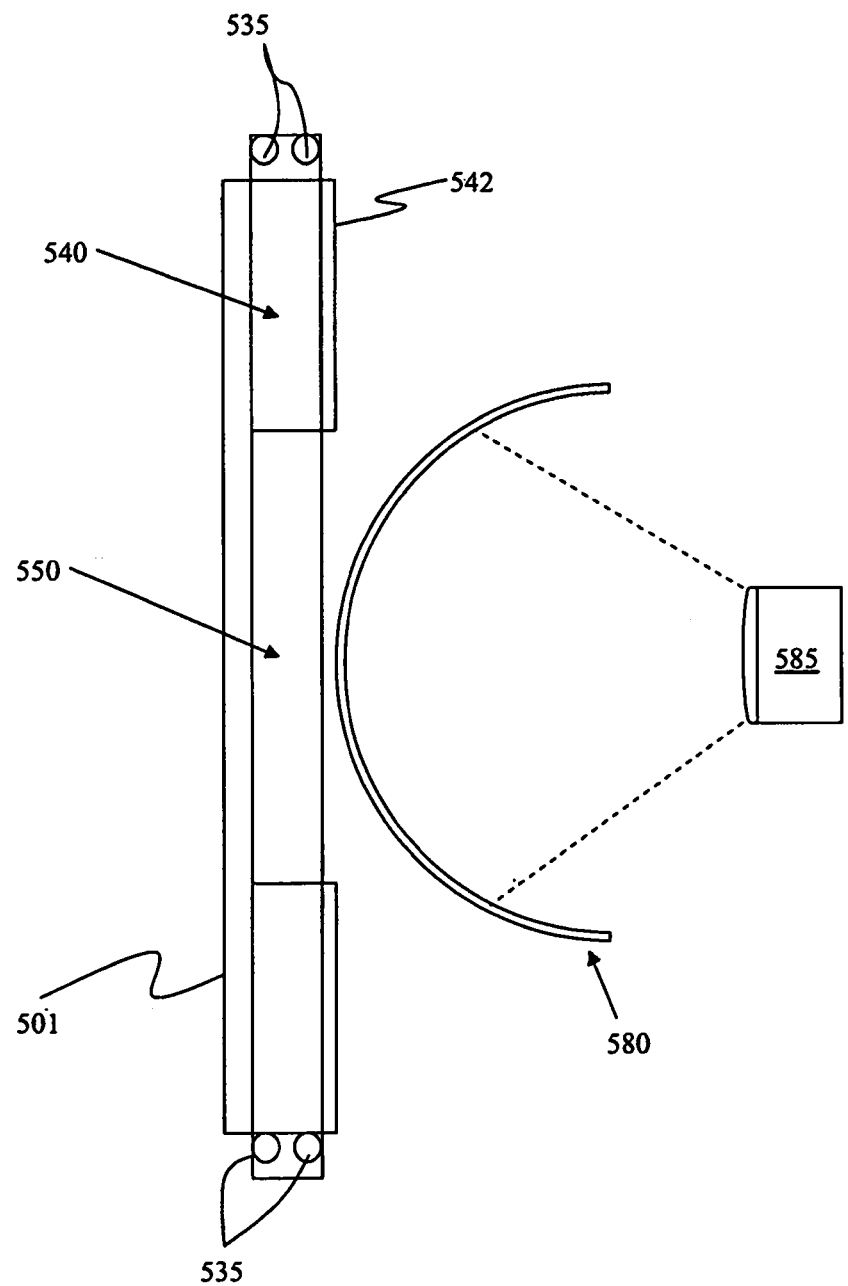
Figure 6E:
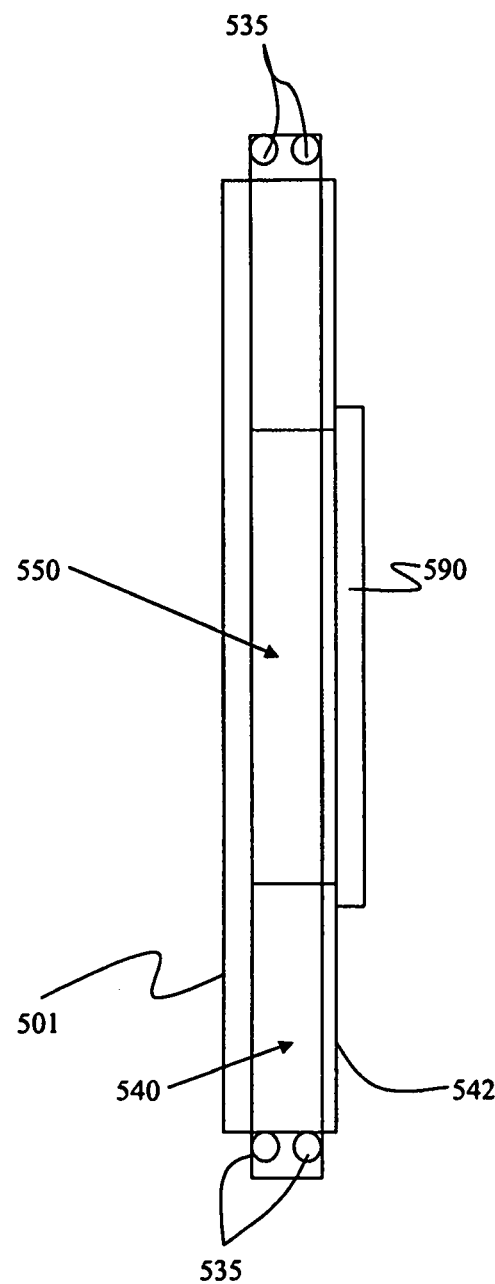

FIGS. 6A-6C shows examples of a simplified transmissive liquid crystal display (LCD) panel 501, which may optionally and advantageously be outfitted with a touchscreen such as is shown in FIG. 5C. A mechanical reel 560 is shown to be disposed behind the transmissive touchscreen LCD panel 501 in accord with various aspects of the present concepts. FIG. 6D shows an example of a transmissive LCD panel 501 disposed in front of a simulated mechanical reel 580 in accord with another aspect of the present concepts. FIG. 6E shows an example of a transmissive LCD panel 501 disposed in front of another display device 590 (e.g., a flat panel display, a CRT, etc.) in accord with still another aspect of the present concepts. Although the mechanical reel 560, simulated mechanical reel 580, and display device 590 are represented as being spaced apart from the transmissive LCD panel 501 (e.g., FIGS. 6A, 6C, 6D), at least partially within the transmissive window 550 of the transmissive LCD panel (FIG. 6B), or contiguous with the transmissive LCD panel (FIG. 6E), any display device, whether mechanical, electronic, or electromechanical in nature, may be disposed at any distance from the backside of the transmissive LCD panel in the vicinity of the transmissive window 550 (e.g., contiguous with or spaced apart from) and may be laterally aligned with the transmissive window or may be offset therefrom.

The transmissive LCD panel 501 comprises several layers, as described above in relation to FIGS. 5A-5C, and includes an illumination layer 540 and an opaque or reflective layer 542. Illumination layer 540 is illuminated by, in this example, lights 535 (e.g., CCFLs, HCFLs, incandescent bulbs, etc.). The illumination layer 540, in combination with the reflective or opaque layer 542, diffuses and distributes the illumination input from the sides of the illumination layer to ensure uniform illumination of the transmissive LCD panel 501. The transmissive LCD panel 501, as shown in the examples of FIGS. 6A-6E, is positioned over an underlying display, such as a mechanical reel 560, simulated reel 580, or display device 590.

The superimposed video image presented on the transmissive LCD panel 501 may serve any number of functions. For example, the video image presented on the transmissive LCD panel 501 may be used to highlight winning combination(s) (e.g., "7," "7," "7",) associated pay line(s), and/or depict the award for that winning combination. Alternatively, the video image may obscure all symbols not appearing on an active pay line or not part of a winning outcome. The video image may further include special effects such as flashing the winning pay line(s) and/or the award and providing desired themed graphics. In embodiments of a transmissive LCD panel 501 outfitted with a touch screen, the video image on the transmissive LCD panel portrays touch keys wherein a player can then enable a desired function by touching the touch screen at an appropriate touch key. Thus, the superimposed video image, along with a touch screen, may be used to implement side betting, such as is disclosed in U.S. Patent Application Publication No. 2004/0219968, to Fiden et al., filed May 1, 2003, and entitled "Gaming Machine with Interactive Pop-Up Windows," which is incorporated herein by reference in its entirety. In some embodiments, the superimposed video image may provide a foreground image that interacts with a background image on the primary display. The superimposed video image may be used to provide additional games instead of or in addition to interacting with a wagering game display on a primary game display.

Basic wagering games and/or bonus games may also be played, in whole or in part, using the superimposed video image. Further, the video image maybe used to modify one or more symbols printed on one or more of the stopped mechanical reels (e.g., mechanical reel 560) or to display a symbol over a blank symbol field (i.e., solid white area) on an underlying mechanical reel, simulated reel, or other random outcome display device.

To form the transmissive LCD panel 501 shown in FIGS. 6A-6E, one or more aligned portions of the illumination layer 540 and the reflective or opaque layer 542 are removed in the transmissive region(s) of the liquid crystal display assembly to form one or more apertures or windows 550 through which a mechanical reel 560, or other object or device (e.g., a display device such as a LED display, TFT LCD display, plasma display panel (PDP), etc.), may be viewed. Alternatively, in lieu of the act of removal of a portion of the illumination layer 540 and reflective or opaque layer 542, such as by a post-manufacture cutting or etching process, the illumination layer 540 may be formed with the aperture or window 550 during manufacture, with the reflective or opaque layer being applied on the remainder of the illumination layer.

In the embodiment shown in FIG. 6A, the opening of the aperture or window 550 is covered by an optional transmissive substrate 555 functioning as a protective cover. The transmissive substrate 555 may comprise a transparent material such as, but not limited to, polycarbonate, acrylic, etc. As a protective cover, the transmissive substrate 555 is configured to shield the back side of the transmissive portion of the liquid crystal display panel from being scratched by contact with other objects or from accumulating dust. As shown in the example of FIG. 6B, the transmissive substrate may be inserted in the aperture or window 550. An opaque or reflective perimeter insert or treatment may optionally be provided to optically isolate the inserted transmissive substrate 555 from illumination in the remainder of the illumination layer 540. The transmissive substrate 555 shown in FIG. 6B (or FIG. 6A) may alternatively comprise a transparent organic light emitting diode (OLED) panel. In this configuration, a transmissive substrate 555 comprising an OLED panel is disposed behind a transmissive portion 550 of the transmissive LCD display panel 501 and the transmissive substrate is operable to selectively provide light (e.g., an "on" state) or remain in a transparent or substantially transparent state (e.g., an "off" state).

In the example of FIG. 6B, transparent lights 565 are optionally disposed at the edge of the aperture or window 550 in the backlight layer 540 and reflective or opaque layer 542, and are selectively actuatable to light the back side of the transparent portion of the LCD display. The transparent portion lights 565 may be directed toward the back side of the transparent portion of the display, such as by use of light-emitting diode elements with lenses oriented to focus the light produced toward the back side of the transparent portion. In other embodiments, the light produced by lights 565 may likewise be directed toward the reel strip 560. In the example of FIG. 6C, lights 575 and associated reflectors 570 are disposed to illuminate the aperture or window 550 area of the LCD panel 501, the front of the mechanical reel 560, or both the aperture or window 550 of the LCD panel and the front of the mechanical reel. The lights 575 are selectively actuatable to enhance the visibility of the mechanical reel 560 and/or of graphics or video shown on the transparent portion of the LCD display 501.

FIG. 6D shows an example wherein a projector 585 (e.g., a rear projection device or a front projection device) is used to project images on a transparent viewing screen 580 to simulate the movement of a mechanical device, such as a mechanical reel. The transparent viewing screen 580 has a radius of curvature similar to the radius of curvature of a mechanical reel within a typical slot machine. The projector 585 may comprise any conventional projection technology such as, but not limited to, liquid crystal on silicon (LCoS) technology, laser projection displays (e.g., a three-colored laser), DLP or DMD (digital micromirror device) projector, LED projector, LCD projector, CRT projector, etc. In one example, the projector comprises a mini-laser projector as manufactured, for example, by Microvision, Inc. or Explay Ltd or similar devices. The images produced by the projector 585 are dynamic images that move in a manner similar to the movement of, in the example of a simulated mechanical reel, symbols on a mechanical reel. Accordingly, the images include a plurality of symbols used for indicating the randomly selected outcome of the wagering game. From the player's perspective, these images appear to be symbols rotating on a mechanical reel having a radius of curvature equivalent to the radius of curvature of the viewing screen 580. The projection distance from the projector 585 to the viewing screen 580 can vary based on a number of factors including focal length, mechanical limitations, spatial limitations, lensing abilities and other factors that depend on the type of projector 585 and the type of viewing screen 580. The projection distance varies, in at least some aspects of the present concepts, from one inch to several inches.

In some aspects, the viewing screen 580 of FIG. 6D is fixed and, as noted, comprises a transparent or semi-transparent layer having a radius of curvature similar to a mechanical device that the simulation is intended to approximate. For example, when the viewing screen 580 is configured to facilitate the simulation of a mechanical reel, the viewing screen 580 is provided with radius of curvature of a mechanical reel used within a mechanical-reel style of gaming machine 10 (e.g., about four inches to seven inches). Other radiuses of curvature may also be utilized for the viewing screen 580. In other aspects, the viewing screen 580 comprises a movable transparent or semi-transparent film mounted in a fashion that is similar to a mechanical reel in that it includes a central axis and support struts leading from the central axis to the transparent or semi-transparent film or a drum supporting the transparent or semi-transparent film, the drum or central axis being driven by an associated motor, such as a stepper motor.

Because a portion of the back reflective layer and a portion of the illumination layer 540 are removed from the transmissive LCD panel 501 in a region overlying a slot machine reel 560 (FIGS. 6A-6C), simulated reel 580 (FIG. 6D), or display device 590 (FIG. 6E), the corresponding mechanical reel, simulated reel, display device, or other form of random outcome display, can be easily seen by a player through the transmissive LCD panel 501. The transmissive LCD panel 501 remains operational in this region, and is able to superimpose graphics over the reel(s) (e.g., 560) visible through the transmissive LCD panel. As noted above, this configuration allows both presentation of computer graphics or video and direct viewing of a mechanical element or display device disposed behind the transmissive LCD panel. In some aspects, the mechanical element or display device is disposed directly behind the transmissive window 550, whereas in other aspects, the mechanical element or display device can be disposed anywhere behind the transmissive LCD panel 501 (i.e., not directly behind the transmissive LCD panel) where it can be viewed (e.g., obliquely) through the transmissive window 550.

Figure 7:
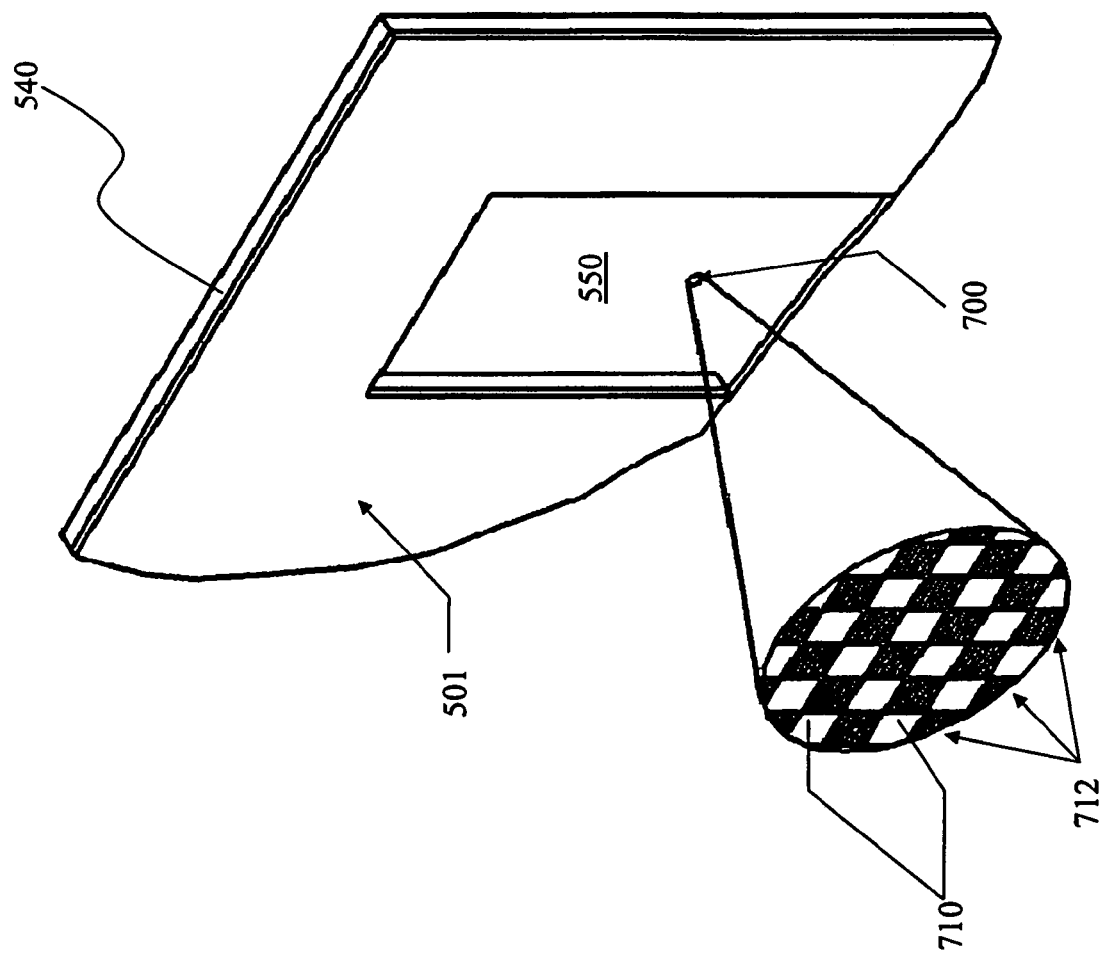
FIG. 7 is a representation of a transmissive LCD display panel, such as is shown in FIGS. 6A-6E, wherein a polarization film of the transmissive LCD display panel is patterned with patterned features in accord with an embodiment of the invention.

As noted previously, with respect to FIGS. 5A and 5B, the back polarizing film 310 and front polarizing film 340 of the LCD panel 501 are associated with an appreciable absorption loss. FIG. 7 shows a representation of one aspect of the present concepts wherein the light guide 540, transmissive LCD panel 501, and transmissive window 550 of FIG. 6C are shown in an isometric view. A portion of the rear polarizing film (e.g., 310 in FIGS. 5A-5B) is shown in an enlarged view to illustrate a half-tone pattern formed in one of the polarizing films 310, 340 wherein, in the illustrated example, about 50 percent of the polarizing film 310, 340 has been removed. This selective removal of, or absence of, the polarizing film 310, 340 improves the transmission of light from the reel 560 or other object or device disposed behind the transmissive window 550 area of the transmissive LCD panel 501 to the player and improves visibility of the mechanical element or electronic element (e.g., another display) disposed behind the transmissive window.

The improved transmissivity through the transmissive window attributable to the selected removal of, or patterning of, one of the polarizing films 310, 340 further enables greater design flexibility for systems incorporating the transmissive LCD panel 501 (e.g., less lights, reduced heating load, etc.). As one example, for the rear projection reels embodiment depicted in FIG. 6D, increasing the brightness by 3x-5x to enhance the brightness to the projectors and the brightness of the images transmitted to the player through the transmissive display markedly increases the cost of the gaming machine 10. The selective removal of the polarizing film (e.g., 310, FIG. 5A) from the transmissive LCD panel 501 increases the transmissivity significantly, but is not entirely without cost, as the removal of the polarizing film 310, 340 adversely affects the functionality of the LCD in the area where the film has been removed. The selective removal of the polarizing film, either the back polarizing film (e.g., 310 in FIG. 5A), the front polarizer (e.g., 340 in FIG. 5A), or both, improves the light throughput without totally eliminating the LCD functionality. From the eye of the player, the display of the mechanical reels, projected reels, or other mechanical device, display, or simulation, will appear significantly brighter with minimal degradation to the LCD display quality. The greater the extent of polarizer that is removed, the brighter the rear display, but the greater too the adverse impact on the quality of the LCD display image.

FIG. 7 shows a representation of a transmissive LCD panel 501 comprising a light guide 540 and transmissive window 550. Also shown is a representation of a polarizing film 700, which could comprise the front polarizing film or the back polarizing film, patterned in a "halftone" type manner, wherein small patterned features 710 (e.g., areas 1 mm² in the example shown) are removed from the polarizing film in a checkerboard pattern 712. As used herein, the term "patterned feature" (e.g., 710) is used to denote an area in which a portion of a polarizing film (e.g., 700) is removed. FIG. 7 thus depicts a plurality of patterned features 710 (represented as the light or blank areas), each in the form of a square, spaced apart and offset from one another to collectively form a checkerboard pattern 712 in the polarizing film 700.

As noted, the patterning of the polarizing film could include either the back polarizing film (e.g., 310 in FIG. 5A), the front polarizing film (e.g., 340 in FIG. 5A), or both polarizing films. "Halftone" patterning is intended to simulate at least substantially continuous tone imagery through the use of patterned features 710 comprising sub-pixels, pixels, or clusters of or arrangements of pixels or dots. In this manner, the presentation of video or visual elements on the transmissive LCD display panel in the area corresponding to the patterned features 710 will, despite some loss in resolution, still convey to the player the desired video or visual elements.

The area of the polarizing film(s) removed to form the patterned features 710, in various aspects, could correspond to individual sub-pixels, pixels or to a multiple of a pixel density, such as by a 2x2, 3x3, or 4x4 pixel grouping, or to other types of pixel clusters. For example, as to sub-pixel patterned features 710, the polarizing film corresponding to only the one of the color components in a conventional (Red-Green-Blue or R-G-B) sub-pixel triplet (e.g., R or G or B) could be removed or any two of the color components could be removed in the area of interest. Although the R, G, and B each play equally important roles in the perception of hue (color) in human vision, they do not play equal roles in the perception of overall brightness. The green elements play the biggest role in determining how bright a pixel looks and the blue element playing the smallest role. Consequently, the polarizing film corresponding to only the blue sub-pixel elements may be selectively removed to enhance brightness while preserving the ability of the pixel, as a whole, to still contribute to the display of a video image or visual element, albeit with a somewhat smaller range of color reproduction for the pixel (e.g., red, orange, yellow, green, etc.). Game designers are, in turn, able to incorporate into any wagering game utilizing the transmissive LCD display panel 501 video images or visual elements that utilize color schemes favorable to any color reproduction limitations of the patterned features 710. In still another embodiment, only a portion of a polarizing film corresponding to a sub-pixel, or to a plurality of sub-pixels, may be removed to form a patterned feature. For example, in one patterned feature 710, half of a blue sub-pixel and half of a red sub-pixel could be removed. In another patterned feature 710, half of a red sub-pixel could be removed and an entire blue sub-pixel could be removed.

The patterning of the polarizing film 700 need not comprise the noted patterned features and may include any desired patterning using any patterned feature 710 or combinations of different patterned features. Patterned features 710 may include, for example, circular dots or elliptical dots that may be contiguous or spaced apart from one another by some predetermined distance. Thus, the patterned features 710 need not be abutting one another as shown in the example of FIG. 7. Instead, patterned features 710, such as circular dots, could be spaced apart by, for example, some multiple of the diameter D of the dot, such as ¼D, ½ D, D, or 2D. Likewise, where the patterned feature 710 is a square, rectangle, ellipse or other repeating shape, other multiples of a dimension of the shape may be selected for spacing. Still further, the patterned feature 710 may comprise a sub-pixel grouping selected from adjacent pixels. For example, the patterned feature 710 may comprise a blue sub-pixel from a first pixel and a red sub-pixel from an adjacent second pixel. Further, the size and/or shape of the patterned features 710 may vary in some aspects, such as to provide a gradient in a predetermined direction.

The patterned features 710 may also be randomly or pseudo-randomly arranged, as opposed to being disposed with a predetermined spacing therebetween. A pseudo-random arrangement may comprise, for example, a random arrangement that is subjected to one or more rules governing the final pattern (e.g., limiting maximum pixel cluster sizes). Additionally, mixtures of patterned features may be provided.

As noted above, the selective removal of the polarizing film 700 to form a patterned feature 710 will, in the area of removal, result in the inability of the transmissive LCD panel 501 to display images in that area (i.e., non-image/non-polarizing pixels which will be transparent), thereby decreasing resolution. However, the patterning of the polarizing film 700 in accord with the present concepts is selected to at least substantially provide a visual reproduction of the original image through a blending of the image pixels with the non-image pixels by the human eye, while avoid deleterious visual effects, such as parallax.

The selective removal of the polarization film may be accomplished, for example, by using conventional photolithographic techniques utilizing an illumination source, imaging optics, an XY stage, alignment optics, servo control electronics, a central computer, and a photomask or reticle (e.g., a chromium-coated quartz mask, aluminum films on quartz and metal foil masks, dielectric films on quartz, etc.). Following any necessary surface treatment (e.g., to promote adhesion of the resist), the resist may be applied in a thin layer by spin coating, slit coating, or a combination of both, depending on the size of the display comprising the polarization film. In slit coating, for example, the resist is applied using a series of micro-nozzles disposed along an axis which moves across the flat panel comprising the exposed polarizing film. The resist-coated panel is then heated and the resist is exposed to patterning using intense light, such as ultraviolet light, or laser ablation (e.g., excimer laser). The resist is chemically altered by the exposure and the exposed area is then able to be removed, together with the immediately underlying photoresist layer, through an anisotropic etching process (e.g., dry etching). The remaining resist may then be removed using a liquid resist stripper or ashing.

Each of these embodiments and obvious variations thereof is contemplated as falling within the spirit and scope of the claimed invention, which is set forth in the following claims. For example, although the examples depicted in FIGS. 6A-6D are shown with respect to a single reel, the depicted reels and transmissive windows can be replicated several times on adjacent reels (e.g., three or five times to produce three or five transmissive windows showing mechanical reels or simulated mechanical reels) to provide a three-reel slot gaming machine 10 or a five-reel slot machine gaming machine. Also, although a number of the examples herein may describe the selective removal of the polarizing film, the present concepts include without limitation the forming of a polarizing film with the disclosed patterning of a polarizing film.

In accordance with at least some aspects of the present concepts, the touchscreen transmissive LCD panel 501 can be provided with a matte finish, a glossy finish, or, in certain advantageous configurations, a selective combination of both. As discussed hereinabove with respect to FIG. 5C, a transparent glass or plastic substrate 524 may be placed so as to overlay the LCD display 301. In the illustrated embodiment, the substrate 524 thus has a forward- or outer-most surface in opposing relation to a rearward- or inner-most surface, both of which are positioned between a player and the underlying display elements, such as, but not limited to, LCD display 301, mechanical reels 560, simulated reels 580, and display device 590 of FIGS. 6A, 6D, and 6E, respectively. In accordance with one particular aspect, a transmissive display (e.g., transmissive LCD display 301, touchscreen transmissive LCD display 501, etc.) may be fabricated, covered, finished or otherwise provided with a matte finish, glossy finish, or combination thereof, such as in association with a transparent cover (e.g., 520) or other film applied externally thereto.

Gloss is an optical property, typically relating to surface finishes that is generally dependent upon the interaction of light with physical characteristics of a surface. In particular, gloss is the ability of a surface to reflect light into the specular direction—e.g., specular gloss is proportional to the reflectance of the surface. Some factors that affect gloss are the refractive index of the material, the angle of incident light, and the surface topography. For instance, increased surface roughness, generally in the micrometer range, diminishes specular reflectance levels and decreases gloss.

A matte finish can be provided, for example, on any one or more viewing surface(s) of the display, such as substrate 524 or transparent cover 520 in the example of the touchscreen transmissive LCD display 501 to, for example, reduce specular reflectance. The matte finish can be produced in any conventional manufacturing or post-manufacturing process for optical substrates and films without limitation. In one example, a touch screen comprising electrodes 502, sensor circuits 510, and associated wiring, including any planarization or protective layers thereupon, is formed on substrate 524 using conventional photolithographic techniques, including any planarization or protective layers thereupon. Such conventional photolithographic techniques generally involve steps comprising, for example, application of various films, such as metallization layers (e.g., transparent conducting oxide (TCO), indium-tin-oxide (ITO), $SnO_x$, Al-doped $ZnO_x$, etc.), conductive polymer films (e.g., PEDOT, polypyrrole (PPy), polyaniline (PANI), etc.), spacers, etch stops (e.g., SiN), and the like, application of a photoresist film on the one or more films, exposure of the photoresist layer (e.g., using UV light and a reticle) to form a pattern in the photoresist, selectively removal of either exposed or non-exposed portions of the photoresist layer to create a photoresist mask (e.g., a checkerboard pattern or pattern of vertical or horizontal trenches), and etching of the underlying film or films through the photoresist mask to form a structure defined by the pattern (e.g., a checkerboard pattern of holes or a pattern of vertical or horizontal trenches having a predefined depth). Using conventional photolithographic techniques, for example, the transparent cover 520 may be formed to comprise an outer surface comprising at least substantially imperceptible if not entirely imperceptible (i.e., to the unaided eye) trenches, openings, or patterns that reduce specular reflection. In yet another example, drying techniques can be employed to create a patterned finish in the transparent cover 520, such as by applying a heated roll having a patterned OD surface against the transparent cover 520 during manufacture to create a pattern within the surface of the material during drying.

A gloss or glossy finish may be provided, for example, by mechanical polishing, chemical polishing, or a combination of mechanical and chemical polishing (e.g., chemical mechanical polishing). As noted with the matte finish, above, the gloss finish can be produced in any conventional manufacturing or post-manufacturing process for optical substrates and films, without limitation. By way of example, where the substrate 524 is fabricated from plastic or other polymeric material, vapor polishing may be used to reduce surface roughness and enhance clarity. In another example, wherein the substrate 524 is fabricated from glass, a combination of polishing and buffing may be used to produce a gloss finish. Various cleaning and polishing agents are available for providing glass and plastics with a glossy finish. Such cleaning and polishing agents generally include one or more abrasive substances (e.g., silica, etc.) in a liquid suspension in the form of a paste or slurry.

In general, a display with a glossy finish tends to produce "richer" images with more color depth and vibrancy than those with a matte finish. However, a display with a glossy finish may be more susceptible to glare, and tends to show fingerprints and smudges more readily. A display with a matte finish, on the other hand, produces noticeably less glare than its glossy-finish counterpart, due to the diffusion or scattering of light thereof, but often reduces contrast and provides a narrower viewing angle, as compared to the glossy finish.

Figure 8:
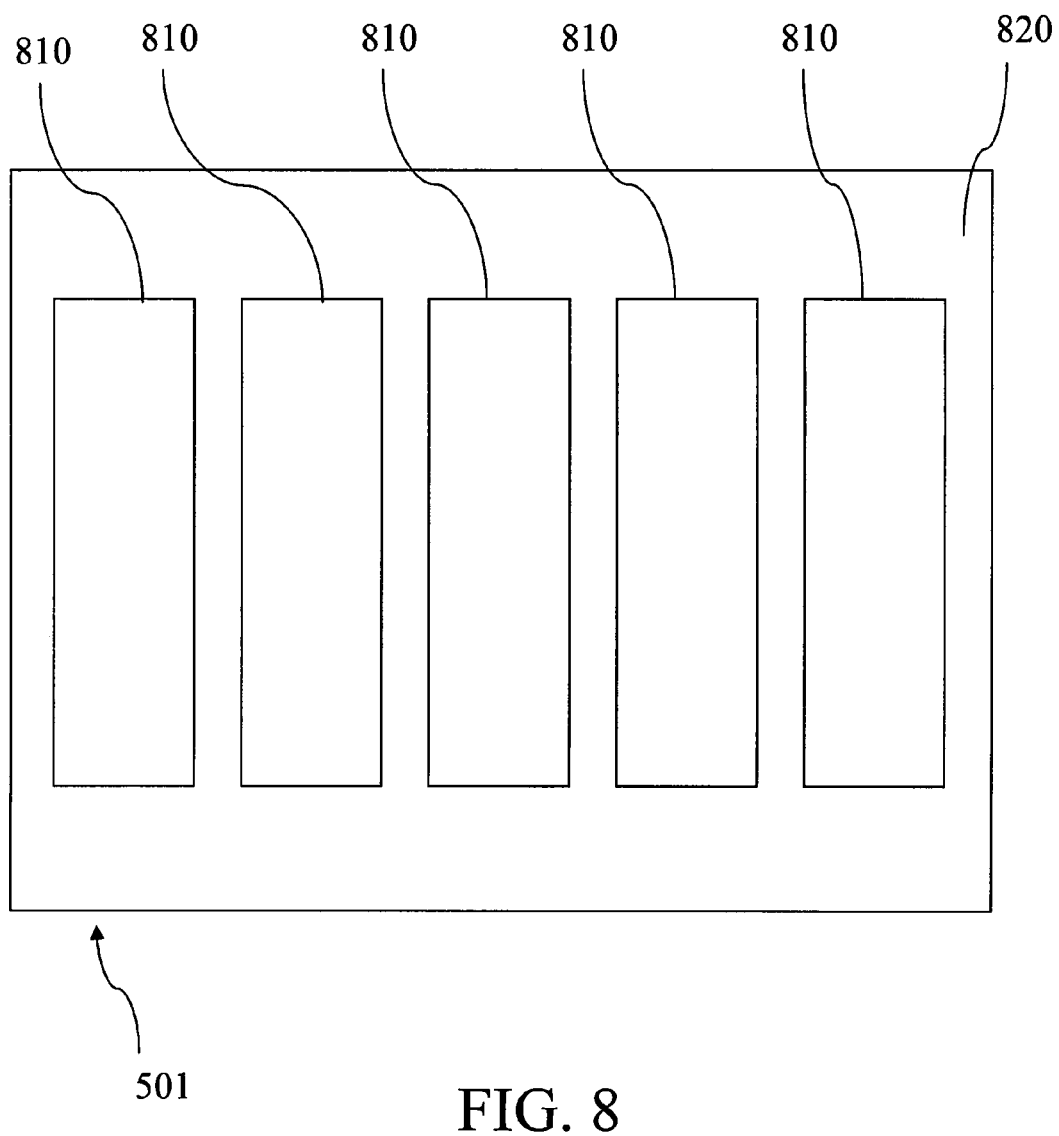
FIG. 8 is a representation of a touchscreen transmissive LCD display with a selective combination of both a matte finish and a glossy finish, according to an embodiment of the present invention.

In accordance with an embodiment of the present invention, the touchscreen transmissive LCD display 501, or other type of transmissive display or other type of display (e.g., a conventional LCD display, plasma display, or CRT display), comprises both one or more areas of a glossy finish 810 and one or more areas of a matte finish 820, each finish type being provided along a predetermined, selective portion or portions of the display, such as is shown by way of example in FIG. 8. According to the illustrative example of FIG. 8, a touchscreen transmissive LCD display 501 comprises a matte finish 820 in areas not corresponding to windows 550 and a glossy finish 810 in areas corresponding to windows 550, as shown in FIG. 8. To arrive at the end result of the display comprising both one or more areas of a glossy finish 810 and one or more areas of a matte finish 820, it matters not the starting point, whether it be a glossy display to which matte finishing or film is applied or provided or a matte display to which glossy finishing or film is applied or provided. Thus, a touchscreen transmissive LCD display 501 initially provided with a glossy finish 810 may have a matte finish applied thereto or formed therein so as to effectively confine the glossy finish 810 to areas corresponding to the windows 550 formed in the illumination layer 540 of the touchscreen transmissive LCD display 501.

In yet other embodiments of the present concepts, the transparent cover 520, other applied film or cover, or other component of the display (e.g., substrate 524), could comprise one or more preselected areas thereof finished with a first finish (e.g., a glossy finish or a matte finish) and one or more other preselected areas thereof finished with a second finish (e.g., the other one of a glossy finish or a matte finish). As described above with respect to the example of FIG. 8, the surface area of the second finish (e.g., a glossy finish) may advantageously align with the windows 550 (e.g., to enhance the richness of the colors). The distribution of, size of, and degree of the gloss finish and the matte finish, respectively, may be individually or collectively varied to accommodate the design parameters of a particular application. For example, using an example of a base matte finish for a topmost or outermost film or surface of a transmissive display, areas of a glossy finish are formed in such outermost film or surface corresponding to the areas of windows 550, or portions thereof. In other words, the glossy finish may be applied to less than the entire area of one or more windows 550 or may itself be applied in a pattern, such as a checkerboard pattern or a striped pattern having stripes of any thickness generally amendable to manufacturing of the varied surface finish, to less than the entire area of one or more windows 550.

The present concepts also include increasing the transmissivity and/or apparent brightness of the display by mechanisms that pass more light through the system, but without increasing light source power consumption.

FIG. 9 shows a conventional color filter 900 having individual R-G-B pixels 910. One R-G-B pixel is shown in an enlarged view as consisting of three cells, or sub-pixels 910a-910c, colored red (910a), green (910b), and blue (910c). The light associated with each sub-pixel 910a-910c of each R-G-B pixel 910 is independently addressable using a graphics controller so that the amount of light to each sub-pixel may be independently varied. FIG. 10 shows a modified color filter 1000 having individual R-G-B-W pixels 1010. One R-G-B-W pixel is shown in an enlarged view as consisting of four cells, or sub-pixels 1010a-1010d, colored red (1010a), green (1010b), blue (1010c), and white (1010d). The light associated with each sub-pixel 1010a-1010d of each R-G-B-W pixel 1010 is independently addressable using a graphics controller to permit independent control of the light output to each sub-pixel. For an LCD application, the white sub-pixel 1010d would preferably be clear or transparent, but could potentially be translucent. The use of the white sub-pixels 1010d permits more light to pass through each pixel without the corresponding loss in brightness associated with the colored sub-pixel, thus increasing overall transmissivity. Visual perception by the player of the underlying display, such as simulated mechanical reel 580 in FIG. 6D, through the overlying transmissive window 550 of the transmissive LCD panel in FIG. 6D, is thereby enhanced. However, resolution is correspondingly decreased.

Figure 11C:
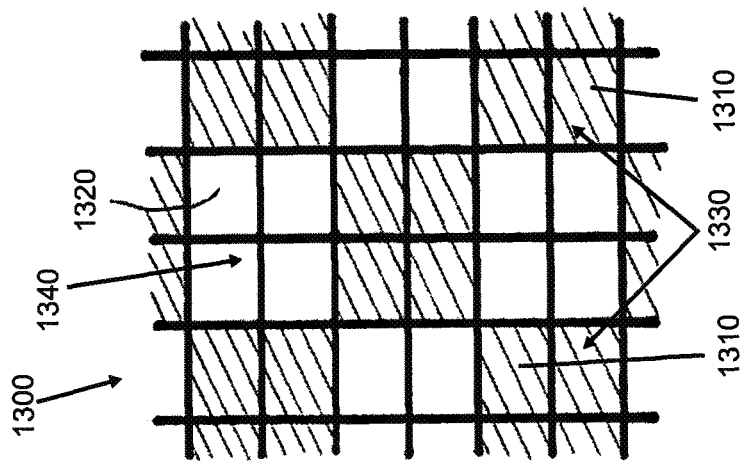
FIGS. 11A-11C show representations of R-G-B-W pixel arrangements in accord with at least some concepts of the present aspects.
Figure 11B:
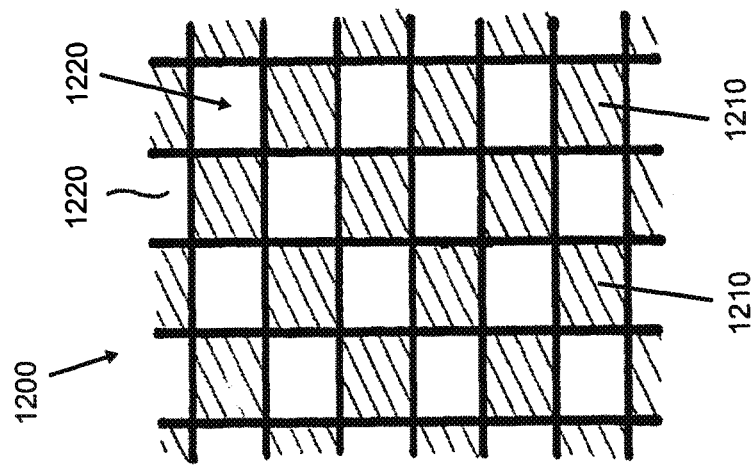
Figure 11A:
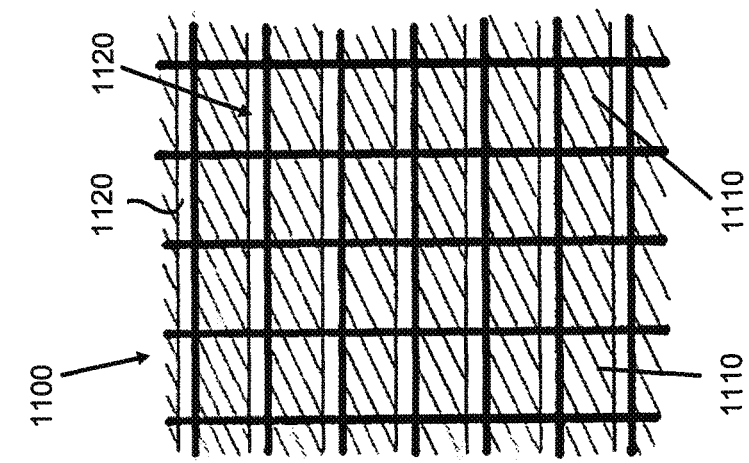

FIGS. 11A-11C show various color filter pixel arrangements in accord with at least some aspects of the present concepts. FIG. 11A shows a pixel array 1100 wherein each pixel 1110 consists of R-G-B-W sub-pixels, such as is represented by way of example in FIG. 10. In each of these pixels 1110, a white sub-pixel 1120 forms 25% of the pixel. FIG. 11B shows another pixel array 1200 wherein each line of the pixel array comprises alternating colored pixels 1210 consisting of R-G-B sub-pixels and white pixels 1220, the lines of the pixel array being offset from one another so that, save for pixels at the boundary of the display, each colored pixel 1210 is bordered by white pixels 1220 on its top surface, bottom surface, left surface, and right surface. Likewise, each white pixel 1220 is bordered by colored pixels 1220 on its top surface, bottom surface, left surface, and right surface. Thus, the pixel array of FIG. 11B shows a pixel arrangement in which 50% of the pixels are white pixels.

FIG. 11C shows still another pixel array 1300 wherein clusters 1330 of colored pixels 1310 and clusters 1340 of white pixels 1320 are regularly arranged. In the example of FIG. 11C, each cluster 1330 of colored pixels 1310 and each cluster 1340 of white pixels 1320 are uniform squares of 4 pixels in a 2×2 arrangement. Thus, approximately 50% of the pixels of the color filter are white pixels. In other aspects, the clusters 1330 of colored pixels 1310 and clusters 1340 of white pixels 1320 may be shaped differently from one another and/or may be irregularly shaped (e.g., a "T" shape, an "L" shape, etc.) in any tiling arrangement, gradient or concentration. Thus, the present concepts embrace any arrangement of colored pixels and white pixels, whether singular pixels or clusters of pixels, that may be regularly arranged or irregularly arranged.

The above-noted examples of FIGS. 10 and 11A-11C depict a stripe-type pixel arrangement wherein each pixel and sub-pixel is in linear alignment with adjacent pixels and sub-pixels in both the horizontal and vertical directions. In the stripe-typed arrangement, for example, for the R-G-B-W pixel array all red sub-pixels are vertically aligned, all green sub-pixels are vertically aligned, all blue sub-pixels are vertically aligned, and all white sub-pixels are vertically aligned. Alternatively, the sub-pixels could be horizontally arranged. The present concepts are likewise applicable to other pixel arrangements, such as a delta-type wherein the sub-pixels are offset from one another in adjacent lines. In such an arrangement, each colored or white sub-pixel is bounded by sub-pixels of another color. For example, a red sub-pixel is entirely bounded by green, blue, and white sub-pixels in the R-G-B-W pixel array. Still further, the sub-pixels themselves may be arranged in a mosaic patterning wherein each colored or white sub-pixel is bounded by sub-pixels of another color, but the pixels in adjacent lines are not offset from one another.

In operation, in one aspect of a display comprising a R-G-B-W color filter 1000, the white sub-pixel 1010*d* or white pixels (e.g., white pixels 1320 in FIG. 11C) may be driven in a continuous "on" state, to varying degrees (or "off" state), depending upon whether the LCD is a "normally white" or "normally black" LCD. For example, instead of forming a yellow pixel using R-G-B-W values of (255, 255, 0, 0), the white component output of the white sub-pixels (e.g., 1010*d*) may be selectively increased to, for example, (255, 255, 0, 60) or (255, 255, 0, 120) to increase overall transmissivity. Likewise, white pixels (e.g., 1320 in FIG. 11C) may be driven in a continuous "on" state, to varying degrees (or "off" state), depending upon whether the LCD is a "normally white" or "normally black," to provide for additional transmitted light through the display. Thus, from the perspective of the player, output color information is slightly degraded in favor of increased transmissivity but, significantly, the players visual perception of the underlying display, such as simulated mechanical reel 580 in FIG. 6D, through the overlying transmissive window 550 of the transmissive LCD panel in FIG. 6D, is enhanced. In this manner, the player can more readily see and interpret the images on the underlying display through such modified color filter.

In another aspect, all sub-pixels in either a R-G-B or R-G-B-W display can be simultaneously driven and maximum voltage, or no voltage depending on the display type, to provide white light, at a frequency cognitively imperceptible to a player, but at a frequency that causes the white output to blend with the frames of colored output to nonetheless provide enhanced brightness. The flicker fusion rate or flicker fusion frequency, the threshold of human perception of individual frames, occurs at about 16 Hz (about 6.25 milliseconds per frame). In a CRT operating at 100 Hz or an LCD display backlight operating at 200 Hz, for example, numerous frames may be adjusted so that all pixels or some pixels output white, such intermittent stimuli being presented to the player's eye at a rate designed to pass below the normal limits of the player's mind's perception (e.g., a every few milliseconds, every 5 milliseconds, every 30 milliseconds, etc.). Various factors, such as the ambient lighting, the luminance of the stimuli (the white output), etc., can be varied, mindful of for example, the Ferry-Porter law, Bloch's law, the Broca-Sulzer effect, LED response time, etc., to avoid conscious perception of the white output. The graphics controller can thus control the driving of individual sub-pixels, pixels, and clusters of pixels, or groupings thereof, at a desired frequency or intermittently at a non-constant rate, to improve the overall brightness. For example, the graphics controller may drive pixels in groupings corresponding exclusively to the transmissive windows or sub-portions thereof.

Although the pixilation discussed above in relation to FIGS. 10 and 11A-11C may be implemented over the entire display color filter, the pixilation discussed above may advantageously be selectively applied only in the areas corresponding to the transmissive windows (e.g., 810 in FIG. 8). As noted above, although the resolution of the outer display is decreased, the player's visual perception of the display underlying the transmissive window is enhanced, thereby improving the player's ability to discern images presented on the underlying display, such as a mechanical reel 560, simulated reel (e.g., 580 in FIG. 6D), or display device (e.g., display device 590 in FIG. 6E). In this manner, the white pixels in the color filter provide an increased perception of transparency of the transmissive LCD display panel (e.g., 501). Accordingly, in the transmissive windows described herein, the properties of the LCD color filter, a polarizing film and/or the surface finish of the transmissive window may each be adjusted, singly or in combination, to improve the player's perception of the transparency of the transmissive window. Moreover, as all pixels in an image area may not be treated equally by a player, who may tend to focus mostly in the center region of the transmissive windows and pay correspondingly less attention to the peripheral areas of the transmissive window, the aforementioned adjustments to the properties of the LCD color filter, polarizing film and/or the surface finish of the transmissive window may be applied not to the entire transmissive window, but rather, singly or in combination, to only a central region thereof.

Figure 12:
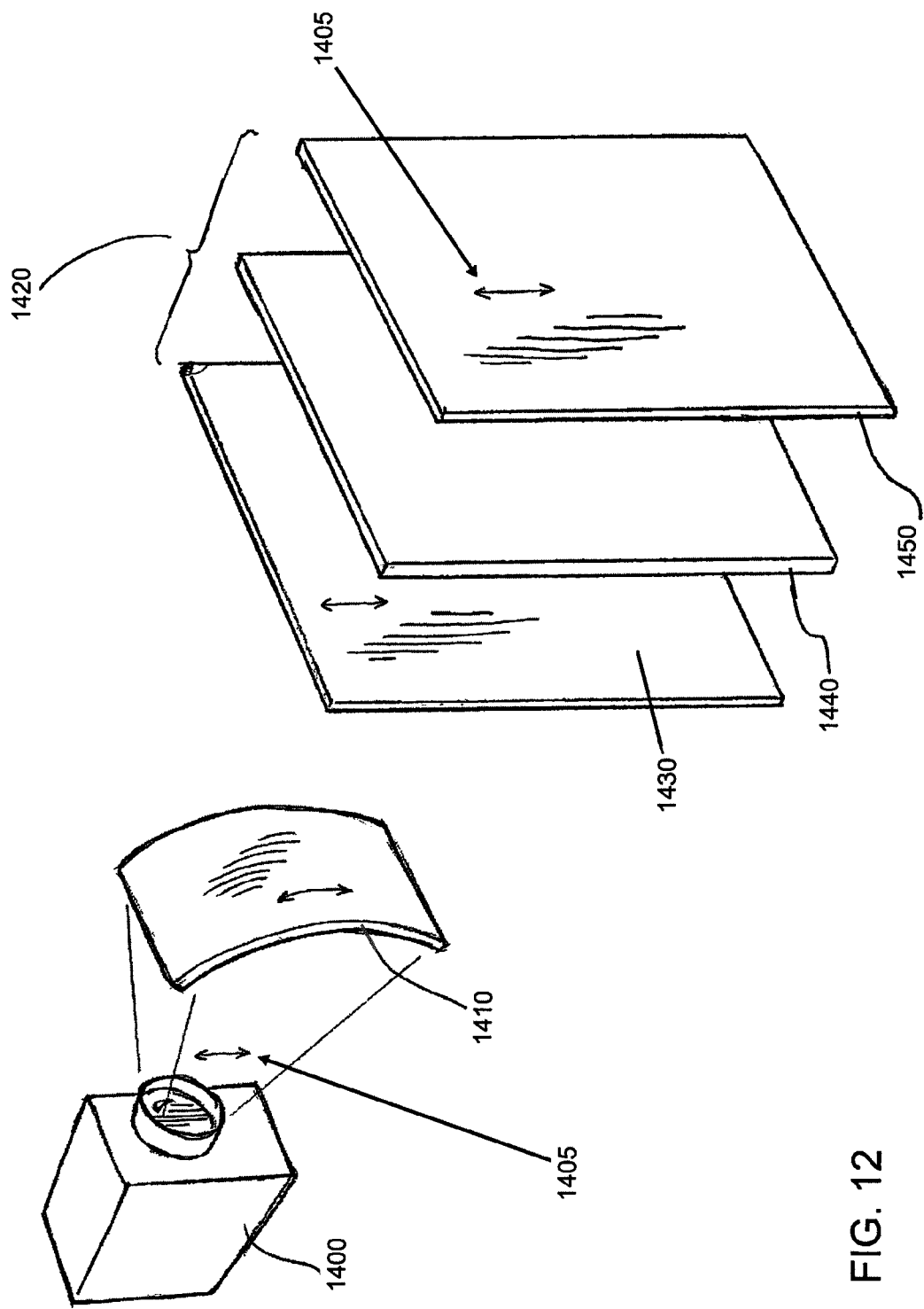
FIG. 12 shows a representation of a projection system for a transmissive display in accord with at least some concepts of the present aspects.

FIG. 12 presents a perspective view of an arrangement similar to that of FIG. 6D, wherein light 1405 output from a projection system 1400 is passed through a rear projection screen 1410 (e.g., a simulated reel, as described above) and then through a transmissive LCD display panel 1420 comprising a rear polarizer 1430, color filter and liquid crystal display 1440, and front polarizer 1450. As shown, the projection system 1400 in this example outputs polarized light 1405 that is aligned along a vertical axis, as indicated by the vertical arrows. This polarized light 1405 is transmitted through the rear projection screen 1410 and into the transmissive LCD 1420 display panel where, here, the polarized light 1405 passes through the rear polarizer 1430, color filter and liquid crystal display 1440, and front polarizer 1450 and is output to the player still in an orientation aligned along a vertical axis. It is preferred that the rear projection screen 1410 comprise a neutral polarizer or neutral polarizing screen material(s). If there is any inherent polarization in the material(s) forming the rear projection screen 1410, or any of its constituent components, it is desired that they be aligned to the initial polarized light 1405 output by the projection system 1400. Accordingly, in this example, the individual components within the projection and display system, each having their specific polarization, are selected and matched to ensure alignment between the polarization of such components to ensure that the maximum amount of light passes through the system.

While the present invention has been described with reference to one or more particular embodiments, those skilled in the art will recognize that many changes may be made thereto without departing from the spirit and scope of the present invention. Each of these embodiments and obvious variations thereof, such as combinations of any of the disclosed steps, acts, components, or features, are contemplated as falling within the spirit and scope of the claimed invention, which is set forth at least in part in the following claims.

The invention claimed is:

1. A gaming system comprising:
 a controller operative to determine a random outcome for a wagering game;
 a first display configured to display the random outcome of the wagering game; and a second display disposed to overlay at least a portion of the first display, wherein the second display comprises a transmissive liquid crystal display defining a transmissive window behind which a corresponding portion of the first display is positioned, the liquid crystal display further comprising a polarizing film having a plurality of patterned features generally aligned with the transmissive window, and wherein the polarizing film is at least partially removed in the area of the patterned features to enhance transmissivity of the liquid crystal display.

2. The gaming system of claim 1, wherein the polarizing film is at least substantially removed in the area of the patterned features.

3. The gaming system of claim 2, wherein the plurality of patterned features form a halftone pattern across at least a portion of the transmissive window.

4. The gaming system of claim 3, wherein the halftone pattern comprises a checkerboard pattern of square patterned features, rectangular patterned features, or both square patterned features and rectangular patterned features.

5. The gaming system of claim 1, wherein at least some of the patterned features comprise a one sub-pixel patterned feature or a two sub-pixel patterned feature.

6. The gaming system of claim 1, wherein at least some of the patterned features comprise a patterned feature corresponding to a sub-pixel from a first pixel and an adjacent sub-pixel from a second pixel.

7. The gaming system of claim 1, wherein a plurality of the patterned features comprise an area smaller than a sub-pixel.

8. The gaming system of claim 1, wherein at least some of the patterned features span a plurality of contiguous pixels.

9. The gaming system of claim 8, wherein the patterned features spanning the plurality of contiguous pixels form a shape of a circle, an ellipse, a square, or a rectangle.

10. The gaming system of claim 1, wherein a spacing between the patterned features is a multiple of a dimension of the patterned features.

11. The gaming system of claim 1, wherein at least some of the patterned features comprise an area and position corresponding to an array of pixels.

12. A liquid crystal display comprising:
a first substrate bearing a first polarizing film;
a second substrate bearing a second polarizing film;
a liquid crystal disposed between the first substrate and the second substrate; and
a backlight disposed behind the first polarizing film, the backlight having an opening therein defining a transmissive window;
wherein at least one of the first polarizing film and the second polarizing film comprises a plurality of patterned features formed in an area corresponding to the transmissive window; and
wherein the polarizing film is at least substantially removed in the area of the patterned feature to enhance transmissivity of the liquid crystal display in the transmissive window.

13. The liquid crystal display of claim 12, wherein the plurality of patterned features form a halftone pattern across at least a portion of the transmissive window.

14. The liquid crystal display of claim 13, wherein the halftone pattern comprises a checkerboard pattern of square patterned features, rectangular patterned features, or both square patterned features and rectangular patterned features.

15. The liquid crystal display of claim 13, wherein the patterned features spanning the plurality of contiguous pixels form a shape of a circle, an ellipse, a square, or a rectangle.

16. The liquid crystal display of claim 12, wherein at least some of the patterned features comprise a one sub-pixel patterned feature or a two sub-pixel patterned feature.

17. The liquid crystal display of claim 12, wherein at least some of the patterned features comprise a patterned feature corresponding to a sub-pixel from a first pixel and an adjacent sub-pixel from a second pixel.

18. The liquid crystal display of claim 12, wherein a plurality of the patterned features comprise an area smaller than a sub-pixel.

19. The liquid crystal display of claim 12, wherein at least some of the patterned features span a plurality of contiguous pixels.

20. A gaming system in communication with a controller operative to determine a random outcome for a wagering game, the gaming system comprising:
a first display configured to display the random outcome of the wagering game; and
a second display overlaying at least a portion of the first display, the second display comprising a transmissive liquid crystal display defining at least one transmissive window behind which a corresponding portion of the first display is positioned,
wherein the second display includes a first surface area having a first degree of transmissivity and a second surface area having a second degree of transmissivity different from the first degree of transmissivity, the first area being different from the second area, and
wherein the first surface area has a glossy finish and the second surface area has a matte finish.

21. A gaming system in communication with a controller operative to determine a random outcome for a wagering game, the gaming system comprising:
a first display configured to display the random outcome of the wagering game; and
a second display overlaying at least a portion of the first display, the second display comprising a transmissive liquid crystal display defining at least one transmissive window behind which a corresponding portion of the first display is positioned,
wherein the second display includes a first surface area having a first degree of transmissivity and a second surface area having a second degree of transmissivity different from the first degree of transmissivity, the first area being different from the second area,
wherein the first surface area has a glossy finish and the second surface area has a matte finish, and
wherein the first surface area corresponds to and is aligned with the area of the at least one transmissive window.

22. A gaming system in communication with a controller operative to determine a random outcome for a wagering game, the gaming system comprising:
a first display configured to display the random outcome of the wagering game; and
a second display overlaying at least a portion of the first display, the second display comprising a transmissive liquid crystal display defining at least one transmissive window behind which a corresponding portion of the first display is positioned,
wherein the second display includes a first surface area having a first degree of transmissivity and a second surface area having a second degree of transmissivity different from the first degree of transmissivity, the first area being different from the second area, and
wherein the first surface area comprises a pixel arrangement different than a pixel arrangement of the second area.

23. The gaming system of claim 22, wherein the first surface area corresponds to and is aligned with the area of the at least one transmissive window.

24. A gaming system for playing a wagering game, the gaming system comprising:
- an input device configured to receive an indication of a wager to play the wagering game;
- a controller configured to randomly determine an outcome of the wagering game;
- a primary display device configured to display the random outcome of the wagering game; and
- a transmissive liquid crystal display (LCD) device adjacent to and facing at least a portion of the primary display device, the transmissive LCD device including a transmissive window aligned with a corresponding portion of the primary display device, the transmissive window being configured to display a video image, the transmissive LCD device further comprising a polarizing film with a plurality of patterned features aligned with the transmissive window, wherein the transmissive LCD device is configured such that light can be transmitted through the patterned features of the polarizing film and the transmissive window irrespective of an operational state of the transmissive LCD device.

* * * * *